(12) United States Patent
Suyal

(10) Patent No.: US 12,456,394 B2
(45) Date of Patent: Oct. 28, 2025

(54) TAMPER-EVIDENT DEVICE WITH OPTICALLY TRANSPARENT LAYER AND RELATED METHOD

(71) Applicant: OPTRICAL LIMITED, Yorkshire (GB)

(72) Inventor: Navin Suyal, Yorkshire (GB)

(73) Assignee: OPTRICAL LIMITED, Yorkshire (GB)

( * ) Notice: Subject to any disclaimer, the term of this patent is extended or adjusted under 35 U.S.C. 154(b) by 730 days.

(21) Appl. No.: 17/055,668

(22) PCT Filed: May 16, 2019

(86) PCT No.: PCT/GB2019/051343
§ 371 (c)(1),
(2) Date: Nov. 16, 2020

(87) PCT Pub. No.: WO2019/220120
PCT Pub. Date: Nov. 21, 2019

(65) Prior Publication Data
US 2021/0241658 A1 Aug. 5, 2021

(30) Foreign Application Priority Data

May 16, 2018 (GB) ..................................... 1807979

(51) Int. Cl.
*G09F 3/00* (2006.01)
*G09F 3/03* (2006.01)
(Continued)

(52) U.S. Cl.
CPC .......... *G09F 3/0292* (2013.01); *G09F 3/0376* (2013.01); *B42D 25/45* (2014.10);
(Continued)

(58) Field of Classification Search
CPC ..... G09F 3/0292; G09F 3/0376; G02B 30/27; G02B 3/0056; G02B 3/0068
See application file for complete search history.

(56) References Cited

U.S. PATENT DOCUMENTS 5,575,507 A * 11/1996 Yamauchi ............ B42D 25/405
283/109
10,823,978 B2 * 11/2020 Zhang .................... B29D 11/00
(Continued)

FOREIGN PATENT DOCUMENTS

EP 2461203 A2 6/2012
GB 2243578 A * 11/1991 ........... G09F 3/0292
(Continued)

OTHER PUBLICATIONS

International Search Report and Written Opinion for corresponding PCT Application No. PCT/GB2019/051343 dated Jul. 31, 2019, 10 pages.

*Primary Examiner* — Bao-Luan Q Le
(74) *Attorney, Agent, or Firm* — Hoffman Warnick LLC

(57) ABSTRACT

A tamper-evident security device including a first part comprising an optically transparent layer including an array of separate optical focusing elements. A second part comprises an array of separate image elements collectively defining an image viewable through the first part. Each of the optical focusing elements is positioned to reveal therethrough a view of one or more of said image element(s). An optically transparent adhesive layer between the first part and the second part which retains the optical focusing elements so positioned with respect to the image elements thereby in cooperation to reveal the image. The first part is mechanically separable from the second part by release of the adhesive layer to cease the cooperation.

20 Claims, 7 Drawing Sheets

(51) Int. Cl.
  *B42D 25/45*    (2014.01)
  *B42D 25/47*    (2014.01)
  *G02B 3/00*     (2006.01)
  *G02B 7/02*     (2021.01)
  *G09F 3/02*     (2006.01)
  *G09F 3/10*     (2006.01)

(52) U.S. Cl.
  CPC ............ *B42D 25/47* (2014.10); *G02B 3/0037* (2013.01); *G02B 7/025* (2013.01); *G09F 2003/0257* (2013.01); *G09F 2003/0277* (2013.01); *G09F 3/10* (2013.01)

(56) References Cited

U.S. PATENT DOCUMENTS

| | | | | |
|---|---|---|---|---|
| 2004/0258562 | A1* | 12/2004 | Mills | G01J 1/50 422/91 |
| 2005/0180020 | A1* | 8/2005 | Steenblik | B42D 25/342 359/626 |
| 2007/0058260 | A1* | 3/2007 | Steenblik | B42D 25/378 359/626 |
| 2008/0037131 | A1* | 2/2008 | Steenblik | B42D 25/378 359/619 |
| 2011/0019283 | A1* | 1/2011 | Steenblik | G02B 3/0031 359/627 |
| 2011/0027538 | A1* | 2/2011 | Hoffmann | G02B 3/0031 428/173 |
| 2013/0004738 | A1* | 1/2013 | Jordan | B42D 25/29 156/60 |
| 2017/0144468 | A1* | 5/2017 | Kaizuka | B42D 25/425 |
| 2018/0194157 | A1* | 7/2018 | Holmes | B41M 3/14 |

FOREIGN PATENT DOCUMENTS

| | | |
|---|---|---|
| WO | 0111591 A1 | 2/2001 |
| WO | 015156723 A1 | 10/2015 |
| WO | 018035126 A1 | 2/2018 |

* cited by examiner

TAMPER-EVIDENT DEVICE WITH OPTICALLY TRANSPARENT LAYER AND RELATED METHOD

FIELD

The invention relates to tamper-evident devices, and particularly to such devices configured to reveal evidence of tampering via a change in the optical/visual properties thereof.

BACKGROUND

It has been estimated that approximately 7% of world trade is trade in counterfeit goods. The ever-increasing online trade has highlighted a need for devices and technologies that can be used to distinguish between an authentic product from one which has been tampered with.

Existing tamper-proofing technologies often employ a break-away component on product packaging or containers, which cannot be re-attached to a packaging or product once opened. In other methods, product packaging or containers are glued shut in such a manner that tampering to open the package/product will distort or fracture the package/product noticeably.

More sophisticated security features enable instant authentication of packaging through visual inspection by the user without requiring expert knowledge. For example, a product marked with highly defined printed lines may be used to create complex designs that are difficult to copy. Engraved images, relief images, grids and patterns have been used in this regard.

Optically variable features affixed to products or packaging, such as holograms, are common and effective overt security features. Examples are common on bank notes and credit cards. These enable packaging to be validated quickly and easily. While these may provide some degree of anti-counterfeiting measure, they are not effective for tamper-proofing on packaging or containers. This is because packaging seals employing this type of technology can simply be carefully removed from a package or container (e.g. with the help of some heat) allowing access within the package/container. The seal can then reattached as before, with no visible detriment to the optically variable feature carried by the seal.

The invention aims to provide an improved, or alternative, tamper-evident security device.

SUMMARY

At its most general, the invention provides a tamper-evident security device comprising a first part comprising an optically transparent layer including an array of optical focusing elements, a second part comprising elements defining a pattern viewable through the first part, and an adhesive layer between the first part and the second part which retains the optical focusing elements in alignment with the pattern thereby in cooperation to reveal a predetermined optical effect according to the pattern. The first part is mechanically separable from the second part by release of the adhesive layer to cease the cooperation and thereby to cease the optical effect. That is to say, the adhesive layer may be considered to be a release layer. Loss of the (expected) optical effect signals tampering.

The optical focusing elements may be lenses. Examples include lenticular lenses in which case the optical effect may be a lenticular effect. Other examples include 2-dimensional lenses (e.g. substantially or approximately hemispherical or having a convex surface defined by radii of curvature in two orthogonal dimensions). The pattern may comprise an ordered plurality of separate pattern elements collectively defining an image viewable through the first part. Examples of pattern elements include fine parallel lines which may be printed upon a surface of the second part. Successive such lines may be of alternating colour (e.g. interleaved lines) such that lines of one colour collectively define an image in one colour and interleaved lines of another colour collectively define an image in the other colour. This pattern may be used in combination with a lenticular lens array to produce a lenticular optical effect in which only the image of one colour is visible to users viewing from one viewing angle, whereas only the image of the other colour is visible to users viewing from another viewing angle.

The pattern may comprise a sub-set of image elements defining an image for viewing, wherein the sub-set of elements is repeated periodically a plurality of times upon/across a surface of the second part with a spatial repetition period which differs (preferably only slightly: e.g. less than 1%, or less than 0.5% relative difference) from a spatial repetition period of the optical focusing elements (e.g. lenses) of the first part thereby to provide a magnified view of the sub-set of image elements according to a Moire optical effect. For example, successive optical focusing elements of the first part may each be aligned with respect to a separate respective one of a succession of the repeated separate said sub-sets of image elements, amongst the plurality of such sub-sets. Furthermore, successive optical focusing elements of the first part may also each be aligned, respectively, to a different successive one of the image elements within the sub-set of image elements. The result may thereby be that successive optical focusing elements of the first part respectively provide views of successive image elements which are viewed from within successive sub-sets of image elements, and are not merely viewed from within the same sub-set. The result is a magnified view of the image of the one sub-set being repeated, which is defined collectively by the repeated sub-sets of image elements, according to a Moire optical effect. A discussion of such a Moire optical effect can be found in:

M. C. Hutley, R. Hunt, R. F. Stephens, and P. Savander: "*The Moire Magnifier*"; Pure Appl. Opt. 3 (1994) 133-142.

In a first aspect, the invention provides a tamper-evident security device comprising a first part having an optically transparent layer including an array of separate optical focusing elements, and a second part comprising an array of separate image elements collectively defining an image viewable through the first part wherein each of the optical focusing elements is positioned (e.g. aligned) to reveal therethrough a view of one or more of the image element(s). An optically transparent adhesive layer is disposed between the first part and the second part which retains (e.g. releasably retains, as in a release layer) the optical focusing elements so positioned (e.g. aligned) with respect to the image elements thereby in cooperation to reveal the image. The first part is mechanically separable from the second part by release of the adhesive layer to cease the cooperation. The positioning may take the form of a particular angular alignment between an axis of the array of optical focusing elements, and an axis of the array of image elements. The respective axes may be axis lying with a plane of the arrays of focusing elements and image elements, respectively, associated with an array symmetry or structure/arrangement. The array of optical focusing elements and the array of image elements are preferably planar. The array of optical focusing elements and the array of image elements are preferably planar and mutually parallel. The positioning may take the form of a particular lateral alignment (e.g. a registration) between an optical axis of each optical focusing element, and an associated image element or group of image elements which are to be viewed through a particular optical focusing element. The positioning may take the form of a particular separation (e.g. transverse) between the array of optical focusing elements and the array of image elements.

The removal of the alignment/cooperation of the optical focusing elements and the respective image elements may thereby produce a perceptible change in the optical image/effect viewable before separation. If or when the two separated parts are returned in to contact, the optical image/effect achieved by the relative positioning of the pre-separation alignment/cooperation is altered (or not achieved at all) perceptibly. Optical focusing elements may be positioned for viewing one image element, or a group of image elements, such as a group of two or more neighbouring image elements. The one image element (or group) is/are preferably not simultaneously viewable through at least some of the other, separate (e.g. non-neighbouring, or more distant) optical focusing elements of the optical array. This allows the individual optical focusing elements to be dedicated to reveal only a desired part of the image which is otherwise viewable through the lens array collectively. Thus, the lens array collectively may reveal the whole image as the combination of the individual image elements (or groups of them) revealed through the individual optical focusing elements (or groups thereof) collectively.

Desirably, an (e.g. each) optical focusing element defines a focal length which substantially matches the separation between array of separate optical focusing elements and the array of image elements. Desirably, the focal length is of the order of the combined thickness of the first part and the thickness of the adhesive layer and the thickness of the second part combined. Desirably, an (e.g. each) optical focusing element defines a focal length which differs from the combined thickness of the first part and the thickness of the adhesive layer and the thickness of the second part combined, by not more than 50% of said combined thickness, or more preferably by not more than 40% of said combined thickness, or more preferably by not more than 30% of said combined thickness, or more preferably by not more than 20% of said combined thickness, or more preferably by not more than 10% of said combined thickness. Desirably, an (e.g. each) optical focusing element defines a focal length which substantially matches the thickness of the first part and the thickness of the adhesive layer and the thickness of the second part combined.

Desirably, the first part includes a second array of separate optical focusing elements and a second array of separate image elements which collectively define a second image viewable through the first part wherein optical focusing elements of said second array of optical focusing elements are positioned (e.g. aligned) to reveal therethrough a view of one or more said image elements of the second array of image elements. Each optical focusing element of said second array of separate optical focusing elements may be aligned for viewing a respective image element of the second array of separate image elements not viewable through other said optical focusing elements of said second array of separate optical focusing elements.

Accordingly, desirably not only the second part of the security device contains image elements, but also the first part of the security device also contains image elements. For example, the first part of the security device may comprise a first sub-array of image elements disposed upon an underside surface of the (e.g. flexible transparent plastic layer) first part. The first part of the security device may comprise a first sub-array of optical focusing lenses disposed on the outer surface thereof (e.g. the transparent plastic layer). Each image element of the first sub-array may be in position/alignment with a respective one of the optical focusing lens elements of the first sub-array of optical focusing lenses. Each image element of the first sub-array may be positioned to be within the focal length of the lens within which it is in position/alignment. Similarly, the second part of the security device may comprise a second sub-array of image elements disposed upon an underside surface thereof (e.g. a flexible transparent plastic layer) of the part. The second part of the security device may also comprise a second sub-array of optical focusing lenses disposed on the outer surface thereof (e.g. transparent plastic layer). Each image element of the second sub-array may be in position/alignment with a respective one of the optical focusing lens elements of the second sub-array of optical focusing lenses, and may also be positioned to be substantially coincident with the focal length of the lens within which it is in position/alignment.

Each of the first and second sub-arrays of image elements may be disposed upon the underside of the first or second part of the security device, respectively, as a printed layer of graphics. A layer of optically transparent and peelable adhesive may be disposed between the underside of the printed graphics layer containing the first sub-array of image elements and the upper side of the second part of the device. The first part of the device may be separated from the second part by release from the adhesive layer by applying a pulling force manually/mechanically to a tab which may be attached to the first part. The consequence of such release is to de-align the optical focusing elements of the lens array relative to the image elements of the second sub-array of image elements, while maintaining the optical focusing elements of the lens array in position/alignment relative to the image elements of the first sub-array of image elements. The visual effect may be to cause an optical image collectively defined by the second sub-arrays of lens elements and image elements to cease, while permitting a optical image collectively defined by the first sub-arrays of lens elements and image elements to continue. This obvious visual effect allows a user to determine when tampering with the device has taken place.

The focal length of the optical focusing elements of the first sub-array may be shorter than the focal length of the optical focusing elements of the second sub-array. Each optical focusing element may define a focal length which substantially matches the separation between array of separate optical focusing elements and the array of image elements it is so positioned (e.g. aligned) with. Each optical focusing element may define a focal length which differs from this separation by not more than 50% of that separation, or more preferably by not more than 40%, or more preferably by not more than 30%, or more preferably by not more than 20%, or more preferably by not more than 10% of that separation. Desirably, an (e.g. each) optical focusing element defines a focal length which substantially matches the separation.

In an alternative, the first sub-array of image elements may be printed as a layer upon the upper side thereof (e.g. transparent plastic layer) of the second part. In this variant, the second part may have a first sub-array of image elements printed on one side nearest to the lens array, and a second sub-array of image elements printed on the other side furthest from the lens array. The peelable adhesive layer may be sandwiched between the e.g. transparent plastic layer of the first part, and the printed layer bearing the first sub-array of image elements. Application of a peeling force to the e.g. transparent plastic layer of the first part causes it, and the array of lens elements residing on its upper side, to be released from the second part and de-aligned from the first sub-array of image elements as well as from the second sub-array of image elements.

Desirably, an (e.g. each) optical focusing element defines a focal length which is of the order of the thickness of the first part and the thickness of the adhesive layer combined. Desirably, an (e.g. each) optical focusing element defines a focal length which differs from the combined thickness of the first part and the thickness of the adhesive layer, by not more than 50% of said combined thickness, or more preferably by not more than 40% of said combined thickness, or more preferably by not more than 30% of said combined thickness, or more preferably by not more than 20% of said combined thickness, or more preferably by not more than 10% of said combined thickness. Desirably, an (e.g. each) optical focusing element defines a focal length which substantially matches the thickness of the first part and the thickness of the adhesive layer combined.

Preferably, some or each of said optical focusing elements define a respective optical aperture the width dimension of which does not exceed 200 μm.

Preferably, some or each of said optical focusing elements define a pitch between successive optical focusing elements and some or each of said image elements has a width dimension substantially equal to or less than one half of said pitch of the respective optical focusing element with respect to which it is so positioned.

Desirably, some or each of said image elements has width dimension not exceeding 100 μm.

Preferably, an (e.g. each) optical focusing element defines a focal length which is of the order of the separation between the optical focusing element and the image element with which it is so positioned (e.g. aligned). Desirably, an (e.g. each) optical focusing element defines a focal length which differs from the separation between the optical focusing element and the image element with which it is so positioned (e.g. aligned), by not more than 50% of said separation, or more preferably by not more than 40% of said separation, or more preferably by not more than 30% of said separation, or more preferably by not more than 20% of said separation, or more preferably by not more than 10% of said separation. Desirably, an (e.g. each) optical focusing element defines a focal length which substantially matches the separation between the optical focusing element and the image element with which it is so positioned (e.g. aligned).

Preferably, some or each of said optical focusing elements has a focal length which does not exceed 200 μm.

Desirably, an (e.g. each) optical focusing element comprises a lens.

Preferably, the adhesive layer is arranged to be not re-adherent to the first part or the second part after a said release of the adhesive layer from the first part or the second part, respectively.

Preferably, the first part, the second part and the adhesive layer collectively define a laminate.

Preferably, the adhesive layer is arranged such that a peel strength required to release first part from second part is not greater than is required for a manual peeling action. The peel strength may be not greater than 300 gm/inch (11.81 kg/m), and even more preferably in the range of 50 m/inch to 250 gm/inch (1.97 kg/m to 9.84 kg/m).

The adhesive layer may be arranged to release the first part from the second part upon application of a tensile strain.

The temper-evident security device may define a label in which a second adhesive layer is disposed on a surface of the second part other than between the second part and the first part, wherein the second adhesive layer is tacky for affixing the label to a surface.

In any aspect, the device may be configured to produce a Moire Magnifier optical effect (also known, in the art, as an 'integral image' effect) caused by a periodic re-positioning/ re-alignment or re-registration between lenses of the lens array and image elements of an underlying array of image elements. The array of image elements may comprise a regularly repeating sub-group which repeats along the array with a constant centre-to-centre spatial period (pitch). Each sub-group may be identical to each other and may also comprise a plurality of image elements arranged linearly in a spatial order. Overlying each sub-group of image elements may be a lens of the array of lenses arranged a regularly repeating array with a constant centre-to-centre spatial period (pitch) between lenses. A difference may exist between the pitch of the lens array and the pitch of the sub-groups. The resulting Moire magnification factor is dependent on this pitch difference. In a Moire magnifier effect, the entirety of each sub-array image may be located below one respective lens of the lens array. This may have the effect of magnifying the sub-array of image elements so that the image 'seen' by the viewer is a magnified version of the image formed by a sub-array of image elements.

In any aspect, the device may be configured to produce a lenticular optical effect. This lenticular effect may be provided by a positioning/alignment or registration between lenses of the lens array and image elements of an underlying array of image elements. In this case, the full image is comprised of many finer image elements over a larger region, and need not be the magnification of a sub-array positioned underneath each lens. The repetition frequency of fine, single image elements may be of the same order as (or substantially the same as) that of the lenses. An array of image elements may comprise some elements of one colour (e.g. red elements) defining an image of that colour collectively, and interleaved with this may be an array of image elements comprising other elements of a different colour (e.g. blue elements) defining another image of that colour collectively. The width of image element of one may be substantially the same as the width of image element of the other colour. An image element may be of the order of half of the lens pitch (or aperture). In this case, the angles at which only one of the two images is viewable is the same size (but different orientation) as that angles at which the other image alone is viewable. Alternatively, the differently-coloured image elements may be of different respective sizes in which case the respective image viewing angles may differ. Desirably, three types of image elements (e.g. three colours) may be used to this effect. More may be used. In this arrangement, preferably each lens corresponds to (reveals) three (or more) image elements, one of each of three different colours (e.g. red, green and blue. The width of each image element may be ⅓ of the width of the overlying lens aperture (or ¼ if four colours/elements are used, and so on). The image elements and lenses may be accurately registered, but they do not have to be registered. For example, an image element can be part under one lens and part under another (neighbouring). In that case the eye can still construct the image.

In any aspect, the device may be configured such that the image elements of an array of image elements need not be precisely positioned/aligned or exactly registered with lenses of the array of lenses. Desirably, the spatial repetition frequency (or pitch) of lens elements within the array of lens elements, may be of the same order as the spatial repetition frequency (or pitch) of image elements within the underlying array of image elements. The maximum difference between the value of the spatial repetition frequency (or pitch) of lens elements and the value of the spatial repetition frequency (or pitch) of image elements may be very small, e.g. as little as 1% in relative terms.

The print pattern may be an array of image elements (e.g. lines/dots/symbols) of sizes/diameters may be less than 100 µm, or less than 50 µm, or less than 25 µm. The pitch/period of the image elements (e.g. the spatial distance between corresponding parts of successive elements in the array) preferably differs relative to the pitch/period of lenses of the lens array by e.g. not more than 1%. The pattern may be such that the image elements collectively form an image whereas, regions where there are no image elements may collectively present no image (or a different image to that collectively presented by the image elements). Any print method capable of printing fine lines or dots or other image elements can be used for this purpose. The examples of such methods include: lithography, flexography, gravure or inkjet methods, or a custom variation of these generic methods. The print pattern may comprise a single colour graphic. A single colour graphic may be followed by (e.g. back-coated) an overall cover coating comprising a different colour to that of the printed pattern, such as a complementary second colour, leading to a two-colour effect whereby a printed pattern presents one colour and those parts between image elements of the printed pattern present the other colour of the cover coating. Alternatively, the optical effect described thus far may also be combined with/complemented by a colour graphic printed using standard methods. Such multi-colour graphic may be printed at the front, at back or in any of the layers in between.

The optically transparent adhesive may also be arranged to undergo a visible colour change when exposed to air as a result of separating the layers of the device. For example, when the two layers of the label are separated as a result of tampering, the interface and the adhesive at the interface may be exposed to atmospheric air/oxygen and moisture. Any suitable mechanism that leads to a change of colour on exposure to air or moisture when the label is tampered with in this way can be used for the purpose of tamper proofing. An indicator ink may be used for this purpose. For example, the indicator ink may include: a UV absorbing semiconducting photo-catalyst, a redox indicator dye, a mild reducing agent as the sacrificial electron donor, and an encapsulating polymer. The indicator ink may be configured and arranged to lose its colour rapidly (e.g. in <30 seconds) by being exposed to UV light. An indicator ink may be coated onto one of the optically transparent layers of the device, or at the top of the adhesive used for laminating the two layers of the device. The indicator ink may comprise any of: titanium dioxide, a solvent-soluble, coloured ion-paired methylene dye, glycerol and the polymer. Preferably, the indicator ink may remain colourless in the absence of UV, while sealed within the device, and may be configured to regain a colour when exposed to oxygen again once by separating the layers of the device to expose the indicator ink. This provides a UV-activated mechanism to switch the indicator "on" at any time, returning to its original colour upon exposure to air.

In another aspect, the invention may provide a method of manufacturing a tamper-evident security device comprising providing a first part comprising an optically transparent layer including an array of separate optical focusing elements, and providing a second part comprising an array of separate image elements collectively defining an image viewable through the first part wherein each of the optical focusing elements is positioned (e.g. aligned) to reveal therethrough a view of one or more of the image element(s). The method includes providing an optically transparent adhesive layer (e.g. forming a release layer) between the first part and the second part which retains (e.g. releasably) the optical focusing elements so positioned (e.g. aligned) with respect to the image elements thereby in cooperation to reveal the image as an optical image. The adhesive strength of the adhesive layer renders the first part mechanically separable from the second part by release of the adhesive layer to cease the cooperation. Optical focusing elements may be positioned for viewing one image element, or a group of image elements, such as a group of two or more neighbouring image elements. The one image element (or group) is/are preferably not simultaneously viewable through at least some of the other, separate (e.g. non-neighbouring, or more distant) optical focusing elements of the optical array. This allows the individual optical focusing elements to be dedicated to reveal only a desired part of the image which is otherwise viewable through the lens array collectively. Thus, the lens array collectively may reveal the whole image as the combination of the individual image elements (or groups of them) revealed through the individual optical focusing elements (or groups thereof) collectively. The optically transparent adhesive layer may be light-sensitive or heat-sensitive. The method may further include applying light (e.g. Ultra-Violet light) or heat to the light-sensitive or heat-sensitive adhesive layer, respectively, to reduce the adhesive strength of the adhesive layer thereby to render the first part mechanically separable from the second part by release of the adhesive layer to cease the cooperation and the optical image.

Desirably, the light-sensitive or heat-sensitive optically transparent adhesive layer comprises an acrylate polymer formed by a polymerisation of monomers or oligomers.

The applying heat to the heat-sensitive adhesive layer may comprise heating the heat-sensitive adhesive layer to a temperature of between 50 degrees Celsius and 100 degrees Celsius. The applying heat to the heat-sensitive adhesive layer may comprise heating the heat-sensitive adhesive layer for a period of time of between 1 minutes and 20 minutes.

The applying light to the light-sensitive adhesive layer may comprise illuminating the light-sensitive adhesive layer with Ultra-Violet (UV) light. The applying light to the light-sensitive adhesive layer may comprise illuminating the light-sensitive adhesive layer for a period of time of between 2 seconds and 20 minutes.

In the method, an optical focusing element may define a focal length which is of the order of the combined thickness of the first part and the thickness of the adhesive layer and the thickness of the second part combined. Desirably, an (e.g. each) optical focusing element defines a focal length which differs from the combined thickness of the first part and the thickness of the adhesive layer and the thickness of the second part combined, by not more than 50% of said combined thickness, or more preferably by not more than 40% of said combined thickness, or more preferably by not more than 30% of said combined thickness, or more preferably by not more than 20% of said combined thickness, or more preferably by not more than 10% of said combined thickness. Desirably, an (e.g. each) optical focusing element defines a focal length which substantially matches the thickness of the first part and the thickness of the adhesive layer and the thickness of the second part combined.

In the method, the first part may include a second array of separate optical focusing elements and a second array of separate image elements which collectively define a second image viewable through the first part wherein optical focusing elements of said second array of optical focusing elements are positioned (e.g. aligned) to reveal therethrough a view of one or more of the image elements of the second array of image elements. Optical focusing element(s) of said second array of separate optical focusing elements may be positioned (e.g. aligned) for viewing a respective image element of the second array of separate image elements not viewable through other said optical focusing elements of said second array of separate optical focusing elements. In other words, optical focusing elements of the second array may be positioned for viewing one image element, or a group of image elements, such as a group of two or more neighbouring image elements. The one image element (or group) is/are preferably not simultaneously viewable through at least some of the other, separate (e.g. non-neighbouring, or more distant) optical focusing elements of the second optical array. This allows the individual optical focusing elements to be dedicated to reveal only a desired part of the image which is otherwise viewable through the lens array collectively. Thus, the second lens array collectively may reveal a whole image (or a greater image) as the combination of the individual image elements (or groups of them) revealed through the individual optical focusing elements (or groups thereof) of the second lens array collectively.

According to the method an optical focusing element may define a focal length which is of the order of the thickness of the first part and the thickness of the adhesive layer combined. Desirably, an (e.g. each) optical focusing element defines a focal length which differs from the combined thickness of the first part and the thickness of the adhesive layer, by not more than 50% of said combined thickness, or more preferably by not more than 40% of said combined thickness, or more preferably by not more than 30% of said combined thickness, or more preferably by not more than 20% of said combined thickness, or more preferably by not more than 10% of said combined thickness. Desirably, an (e.g. each) optical focusing element defines a focal length which substantially matches the thickness of the first part and the thickness of the adhesive layer combined.

Optionally, in the method, some or each of said optical focusing elements may define a respective optical aperture the width dimension of which does not exceed 200 µm.

In the method, some or each of said optical focusing elements define a pitch between successive optical focusing elements and some or each of said image elements has a width dimension substantially equal to or less than one half of said pitch of the respective optical focusing element with respect to which it is so positioned.

In the method, some or each of said image elements has width dimension not exceeding 100 µm.

According to the method, an optical focusing element may define a focal length which is of the order of the separation between the optical focusing element and the image element with which it is so positioned (e.g. aligned). Desirably, an (e.g. each) optical focusing element defines a focal length which differs from the separation between the optical focusing element and the image element with which it is so positioned (e.g. aligned), by not more than 50% of said separation, or more preferably by not more than 40% of said separation, or more preferably by not more than 30% of said separation, or more preferably by not more than 20% of said separation, or more preferably by not more than 10% of said separation. Desirably, an (e.g. each) optical focusing element defines a focal length which substantially matches the separation between the optical focusing element and the image element with which it is so positioned (e.g. aligned).

In the method, some or each of said optical focusing elements may have a focal length which does not exceed 200 µm.

Preferably, a said optical focusing element comprises a lens.

In the method, the adhesive layer may be arranged to be not re-adherent to the first part or the second part after a said release of the adhesive layer from the first part or the second part, respectively.

In the method, the first part, the second part and the adhesive layer may collectively define a laminate.

Preferably, the adhesive layer is arranged such that a peel strength required to release first part from second part is not greater than is required for a manual peeling action. The peel strength may be not greater than 300 gm/inch (11.81 kg/m), and even more preferably in the range of 50 m/inch to 250 gm/inch (1.97 kg/m to 9.84 kg/m). As described above, the method may further include applying light (e.g. Ultra-Violet light) or heat to the light-sensitive or heat-sensitive adhesive layer, respectively, to reduce the adhesive strength of the adhesive layer thereby to render the first part mechanically separable from the second part by release of the adhesive layer to cease the cooperation and the virtual optical image. The method may be such that, before the UV exposure or thermal treatment, the peel strength may be 500 gm/inch (19.69 kg/m) or more, preferably may be 750 gm/inch (29.53 kg/m) or more. After exposing the film to UV or UV and heat both, the tackiness of the adhesive layer may be substantially reduced, and the peel strength may be not greater than 300 gm/inch (11.81 kg/m), and even more preferably in the range of 50 m/inch to 250 gm/inch (1.97 kg/m to 9.84 kg/m).

The adhesive layer may be arranged to release the first part from the second part upon application of a tensile strain.

The method may include disposing a second adhesive layer on a surface of the second part other than between the second part and the first part to define a label, wherein the second adhesive layer is tacky for affixing the label to a surface.

The invention, in any aspect, may provide a tamper-evident device, a tamper-evident label, a tamper-evident seal, a tamper-evident optical device, a lenticular tamper-evident device, a lenticular device, a tamper-evident micro-lens device, or a micro-lens device.

BRIEF DESCRIPTION OF DRAWINGS

There now follow examples and embodiments of the invention, which are useful for a better understanding of the invention, with reference to the following figures, of which.

DESCRIPTION OF EMBODIMENTS

Figure 1:
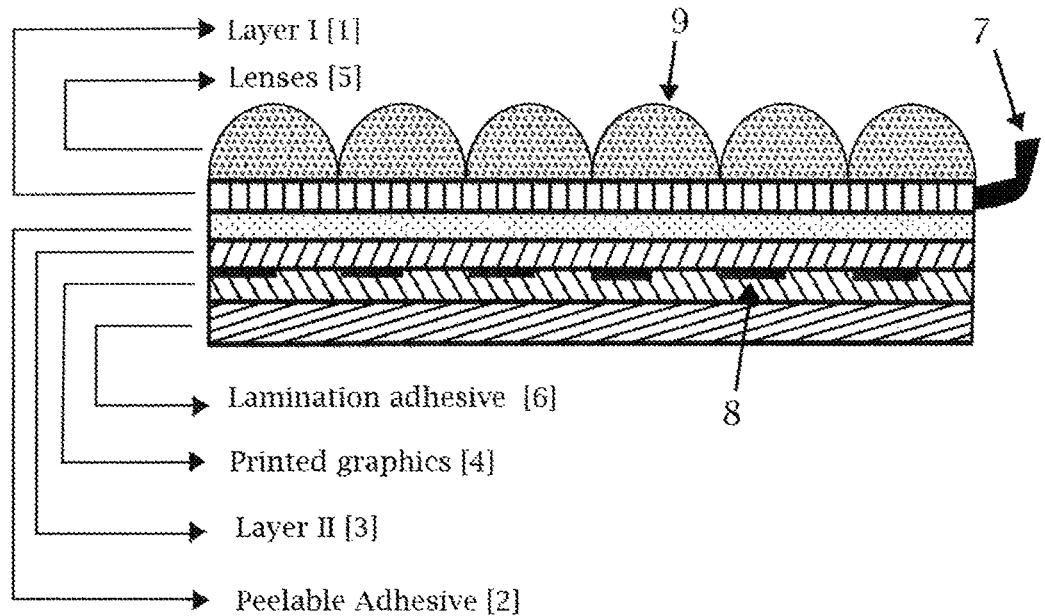
FIG. 1 schematically illustrates a cross-sectional view of a tamper-evident device according to an embodiment of the invention.

In the drawings, like items are assigned like reference signs.

Referring to FIG. 1, there is illustrated a tamper-evident security device (9) in the form of a label, or tape, or sheet, comprising a first part consisting of an optically transparent and flexible plastic layer (1) including upon an upper surface thereof an array (5) of separate optical focusing elements each defining an optical lens. A second part of the device comprises an optically transparent and flexible plastic layer (3) including upon an upper surface thereof a printed array (4) of separate image elements (8) collectively defining an image viewable through the first part (1 & 5) when each of the optical focusing lenses is positioned (e.g. aligned) with a respective image element—as is shown in FIG. 1.

An optically transparent and manually peelable adhesive layer (2) is disposed between the first part and the second part. This adhesive layer retains the optical focusing lens elements (5) so positioned (e.g. aligned) with the image elements (4) thereby in cooperation to reveal the image as an optical image. The first part is mechanically separable from the second part, for example by peeling or by applying a tensile stress longitudinally to the device, to release either the first part or the second part from the adhesive layer, to cease the cooperation and the optical image. A tab (7) is attached to a terminal end of the label at an edge of the transparent flexible layer (1) of the first part. The tab provides a component dimensioned to permit a user to hold the tab between finger and thumb, and to pull in a direction which is both transverse to the plane of the label and away from the second part. The adhesive layer (2) is arranged to permit such peeling separation upon application of a peeling force of any suitable and appropriate magnitude falling within a range values manually manageable by a user and typically employed in manually peeling labels, as would be readily apparent to the person skilled in the art. The peel strength may be not greater than 300 gm/inch (11.81 kg/m), and even more preferably in the range of 50 m/inch to 250 gm/inch (1.97 kg/m to 9.84 kg/m).

Figure 4:
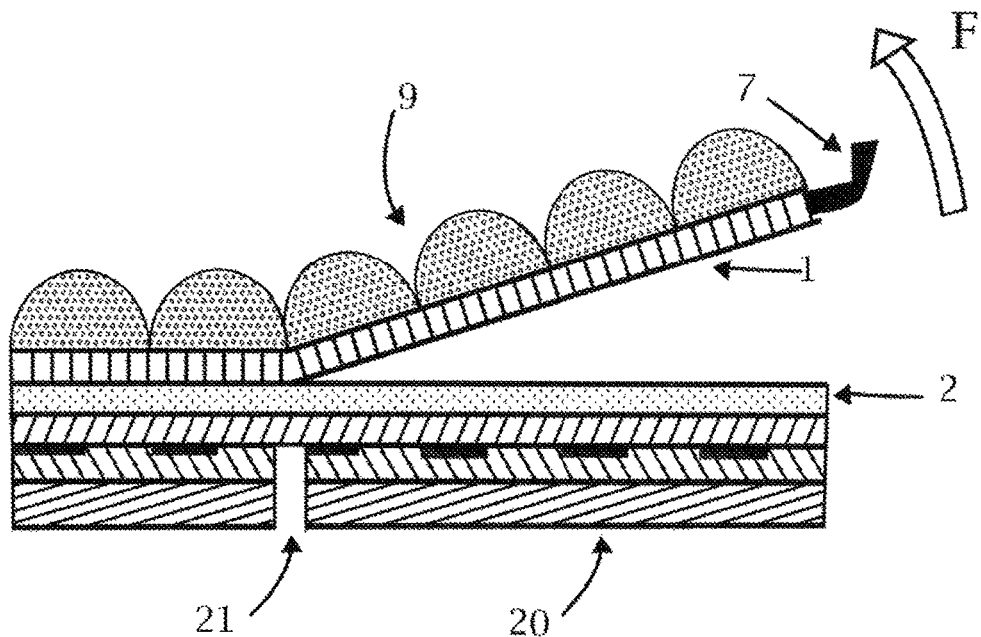
FIG. 4 schematically illustrates a cross-sectional view of a tamper-evident device of FIG. 2 as a label being separated at a kiss-cut by application of a peeling force (F), according to an embodiment of the invention.

FIG. 4 schematically shows such a separation by application of a peeling force (F) in a direction which is both transverse to the plane of the label and away from the second part.

Figure 2:
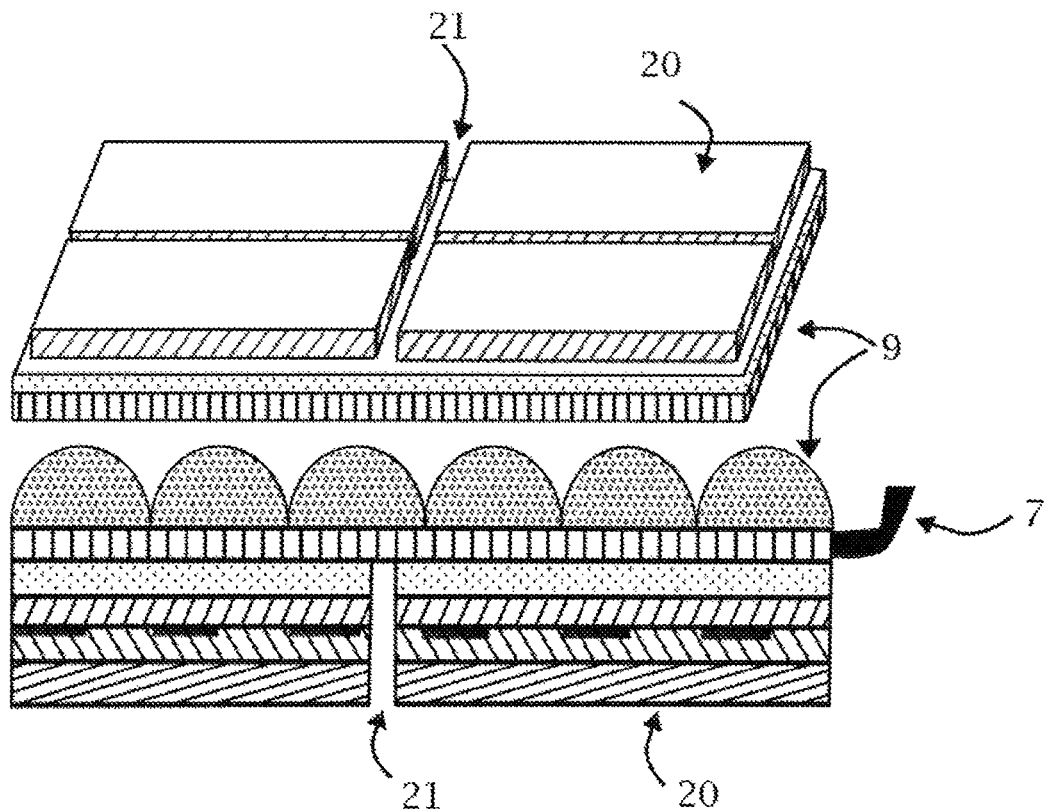
FIG. 2 schematically illustrates a cross-sectional view of a tamper-evident device of FIG. 1 additionally processed with kiss-cuts to provide a separable label, according to an embodiment of the invention.

FIG. 2 schematically illustrates a combined perspective view and cross-sectional view of the tamper-evident device (9) of FIG. 1 when in the form of a sheet.

In a preferred embodiment, a thin backing film (not shown) is first laminated on the front side (i.e. the lenses (5)) of the first part of the device, and a second adhesive (6) is applied to the bottom side of the second part of the device. A protective liner (not shown) is applied over the exposed surface of the second adhesive layer. Labels (20) of required sizes and geometries are then kiss cut with cuts (21) which extend into the device through the protective liner, the second adhesive, the second part and the adhesive joining the second part to the first part. However, the kiss cuts (21) leave the first part of the device (including the front side backing film) intact. The backing film allows the integrity of the whole structure to be retained, while the underlying composite film is cut into labels of required sizes and geometries.

In preferred embodiments, a further kiss cut is also applied in the manner described above, to a part of a label or tape within the body/boundaries of the label/tape at a position intended to coincide with the line/region (21, FIG. 4) of the device up to which the first part and the second part of the device are intended to fully separate, in use, when opening a package to which the device has been applied. The device, when a label or tape, may be affixed to the package so as to place the line/region (21) of the label/tape aligned with a part of the package where an edge of a lid/cover of the package abuts the periphery of the opening of the package when the lid/cover is in the closed position. By separating/peeling the first part of the device wholly away from the second part of the device, at those parts of the device between the kiss cut line/region (21) and the end of the label/tape bearing the tab (7), a section of the second part is separated from the remainder of the device and stays adhered to the package via the second adhesive layer (6). This permits the lid/cover of the package to be opened. The film may alternatively be perforated as a whole along this line allowing it to be torn off along this line when the label is to be opened.

Thus, the kiss cut line/region (21) of the label/tape enables the opening of the package lid when the top layer of the label/tape is pulled splitting the label/tape. This label/tape may applied to packages needing a tamper-evident facility. To do so, the backing films are separated from the label/tape and discarded. This reveals the second adhesive for adhering the label/tape to the package, and also reveals the top layer of optical focusing elements which present to a viewer an optical image of the printed image present within the body of the device, until such time as the label/tape is split as described above.

Figure 3:
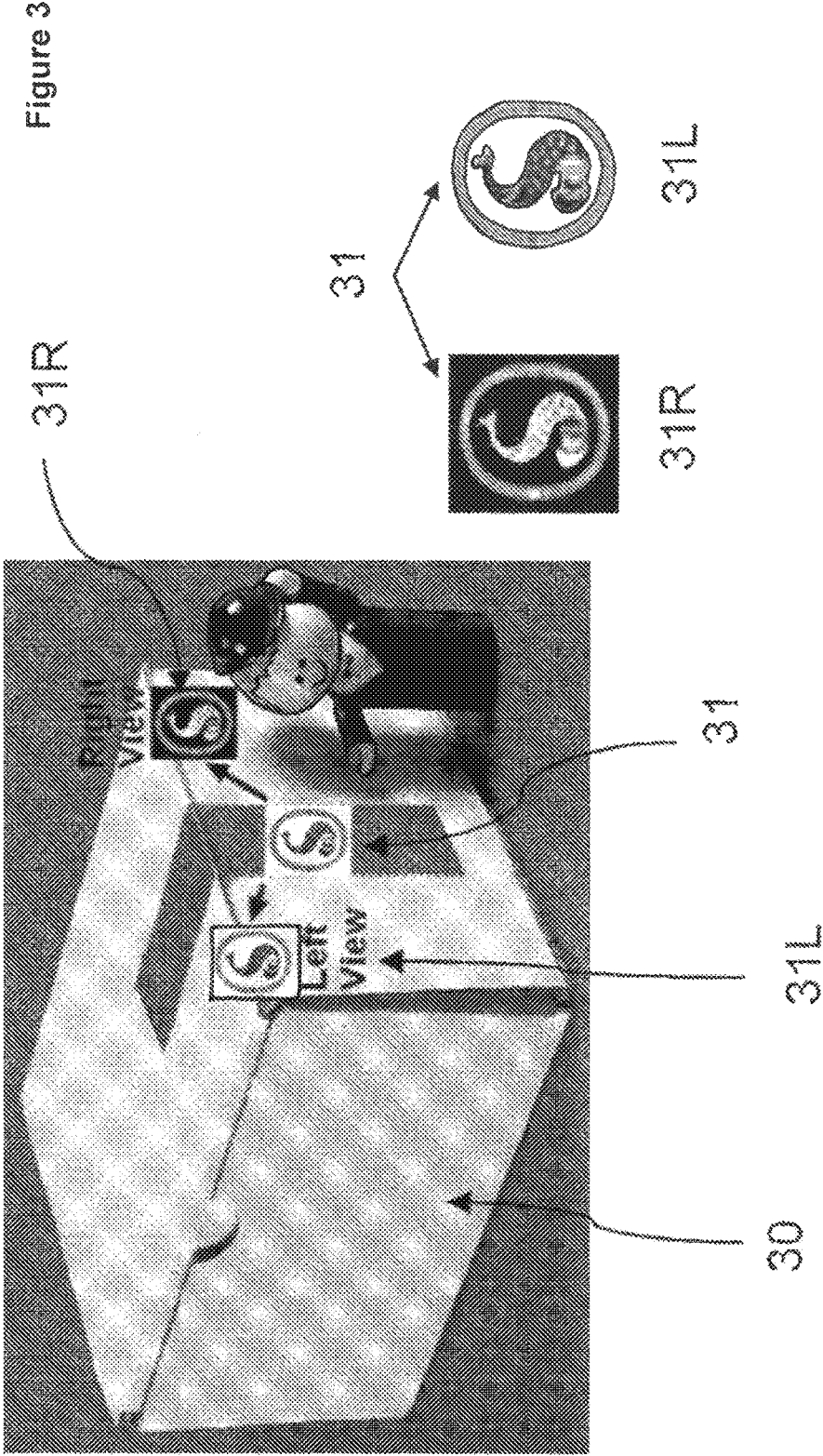
FIG. 3 illustrates a tamper-evident device applied to an item of packaging, and a visually variable optical effect of the tamper-evident device, according to an embodiment of the invention.

FIG. 3 shows a package (30) to which a label/tape (31) according to an embodiment of the invention, has been applied. While the first (1) and second (3) parts of the label/tape structure remain adhered together (i.e. the label/tape is not split), each lens of the array of lenses (5) of the first part remains so positioned (e.g. aligned) with a respective image element (8) within the second part. The result is that the lenses and image elements, so positioned (e.g. aligned), cooperate to collectively define an optical image of the printed image (4) defined in the second part of the device by the image elements (8) collectively. In this example, the desired optical effect is a lenticular optical effect. Accordingly, the image elements are each arranged relative to the respective lens (5), such that the printed image element is visible via the lens in question when the lens is viewed from one side (e.g. the right-hand-side) of the optical axis of the lens, but is not visible when through the lens when the lens is viewed from the opposite side of its optical axis (e.g. the left-hand-side).

As a result, a first image defined collectively by the printed image elements (8), may be made visible to a viewer when viewing the array of optical lenses (5) from one side of the optical axes of the lenses of the array (which have optical axes in parallel), whereas a different image defined collectively by the areas between printed image elements (8), may be made visible to a viewer when viewing the array of optical lenses (5) from the opposite side of the optical axes of the lenses of the array. FIG. 3 illustrates an example of this effect wherein a first optical image (31L) of the array of image elements is presented by the array of lenses when viewed from the left-hand-side of the optical axes of the lenses, whereas a second optical image (31R) of the regions between image elements, is presented by the array of lenses when viewed from the right-hand-side of the optical axes of the lenses. The second optical image is the 'negative' of the first optical image. This is achieved by providing (e.g. printing) image elements (8) of a first colour/shade (e.g. white) upon a surface having a different or complementary colour/shade (e.g. black).

It is to be noted that this effect is lost when the lenses are rendered no longer so positioned (e.g. aligned) with corresponding image elements. This loss of positioning/alignment is achieved e.g. by pealing the first part of the device from the second part, as described above, or by applying tensile stress to the device (e.g. tape/label) to cause a permanent change in the relative position between the lens elements and their respective image elements. It is practically impossible to re-position/align lenses and image elements after they have be de-aligned in this way, thereby preventing the person who has visibly tampered with the device from 'covering his tracks'.

Figure 9:
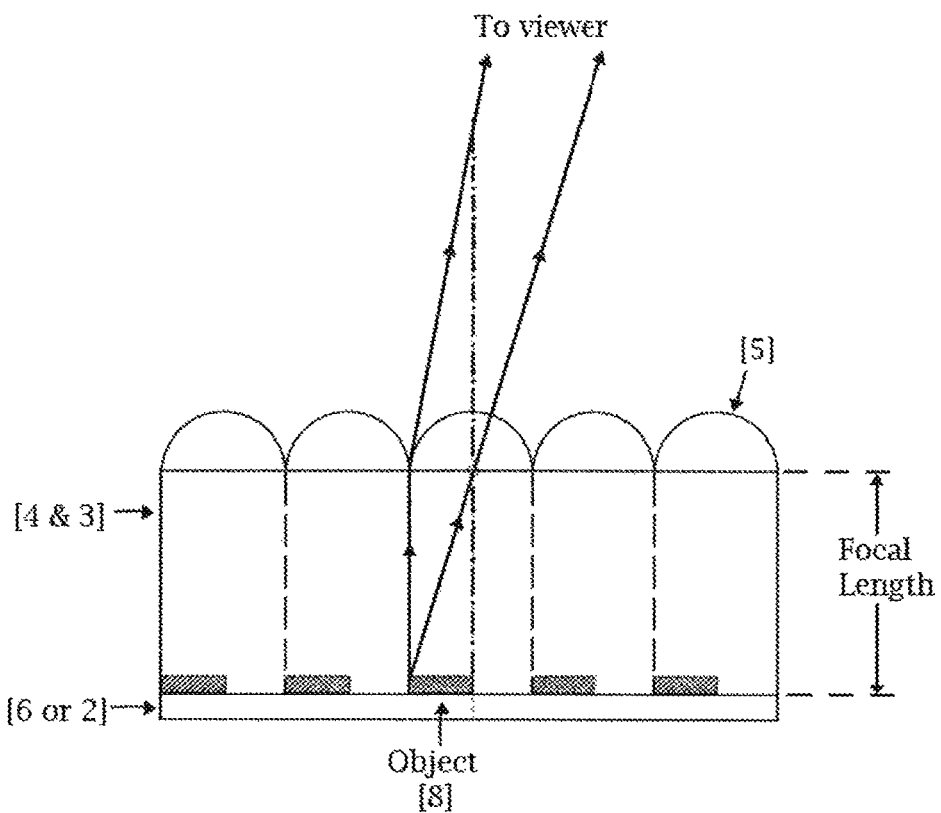
FIG. 9 schematically illustrates a cross-sectional view of a tamper-evident device according to an embodiment of the invention, demonstrating the formation of an optical image according to a lenticular-type optical effect.

FIG. 9 schematically illustrates one example of a lenticular optical function of a lens (5) of the layer of lenses disposed upon the first part of the security device. Other optical functions/effects are possible (e.g. Moire magnification). Each lens defines a focal length defining a focal point (1) residing along the principal optical axis of a given lens. The principal optical axis passes through the centre of the lens in a direction perpendicular to the plane of the array of lenses (5) of which the given lens forms a part. The focal length of a given lens substantially matches the combined thickness of the component layers (3, 4) of the device which underlie the lens in question and overlie the image elements (8). The result is that a focal point nearest to the array of image elements (8) resides with them. An image element (8) associated with a given lens, therefore resides adjacent the principal optical axis of the lens at a distance from the lens which substantially matches the focal length of the lens.

The result of this positioning is that each lens of the array of lenses (5) is able to form an optical image of the image element (8) associated in position/alignment with it. This is diagrammatically illustrated in FIG. 9 by back-extrapolating to a convergent focus, two light rays emanating from a common point on an image element (8) and passing through the optical lens with which the image element is in position/ alignment. A paraxial first optical ray and a second optical ray which passes through the lens centre are substantially collimated as they extend towards a viewer located at the lens-bearing side of the security device. However, back extrapolation of the diverging rays converges at the focal point of the lens located at an image element within the security device, as viewed by a viewer located at an opposite side of the security device. There can be several types of optical effects provided. A first effect is provided when the image elements are positioned (e.g. aligned of registered) with reference to the lenses (this situation is described below). A second effect occurs even when there is no precise registration between the lenses and image elements but just a sufficient longitudinal alignment. In this case some area of image element or elements, will randomly lie around the optical axis of lenses. Therefore some image will be visible even when looking vertically but which will switch when one moves ones head to left or to right and one will see e.g. a second or complimentary image as provided by the appropriate arrangement of the image elements. A third effect is a Moire effect (which is described in more detail below)

It is to be noted that, according to the first affect, when the viewer is located to the right-hand-side of the principal optical axis of the lens then he is able to more fully view the optical image of an image element disposed at the left-hand side of the optical image of the principal optical axis of the lens. Conversely, when the viewer is located to the left-hand-side of the principal optical axis of the lens he/is able to more fully view the optical image of those areas of the second part residing between successive image elements, which are disposed at the right-hand side of the optical image of the principal optical axis of the lens. Thus, viewing the security device from one side of the principal optical axis better reveals a first optical image but not (or less so) the second optical image, whereas viewing the security device from the other side of the principal optical axis better reveals a second optical image but not (or less so) the first optical image. That is to say, a lenticular effect is provided. The lenses of the array of lenses may be lenticular lenses. Each optical element may be a fine line extending in parallel with the long axis of the lenticular lens it is so positioned (e.g. aligned) with. Most preferably, the second optical image clearly differs, visually, from the first image.

The visible optical effect of a clear change in the viewed image depending on the angle of view, is schematically illustrated in FIG. 3 and provides a user with a clear indication of the integrity of the security device (e.g. a label example of FIG. 3). Accordingly, a viewer is able to immediately determine whether or not the security device has been tampered with. Any tampering which has caused the array of lenses to be de-aligned from the underlying array of image elements, in the manner indicated in FIG. 4, causes the optical effect to cease. Even when the de-aligned lens array of the first part of the device, is lowered back into contact with the second part of the device (bearing the array of image elements) the necessary position/alignment between a given lens element and its associated image element is extremely difficult if not practically impossible to achieve manually.

Figure 5:
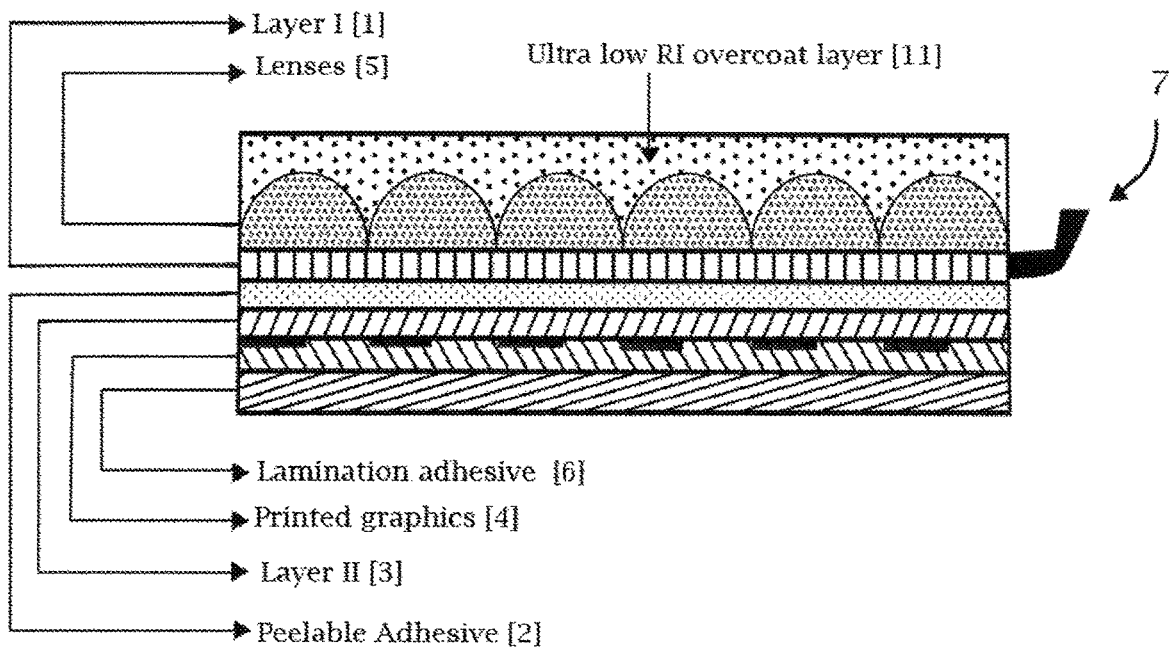
FIG. 5 schematically illustrates a cross-sectional view of a tamper-evident device according to another embodiment of the invention.

FIG. 5 schematically illustrates a variant of the embodiment illustrated in FIG. 1 whereby an optically transparent overcoat layer (11) formed from an optically transparent material of very low refractive index, is disposed over the top surface of the array of lens elements (5). This serves as a protective covering for the lenses. It is preferable that the refractive index of the overcoat layer (11) is as close to the value of 1.0 (one) as possible and that the value of the refractive index is significantly less than the refractive index of the material of the lenses it covers. This is to ensure that a sufficient contrast in refractive index remains at the curved outer surfaces of the lenses, which are in direct contact with the overcoat layer in this embodiment, to allow sufficient optical refraction by the lenses in order to achieve the optical effects described above. Most preferably the refractive index of the material of the overcoat layer (11) is less than 1.45, and an example would be a value between 1.30 and 1.40, inclusive, preferably around 1.35. Suitable optically transparent coating materials such as are readily available and apparent to the skilled person may be employed for this purpose. The refractive index of the material of the lenses is preferably a value greater than 1.55, and more preferably greater than 1.6. For example the refractive index of the material of the lenses may be about 1.65.

Figure 6:
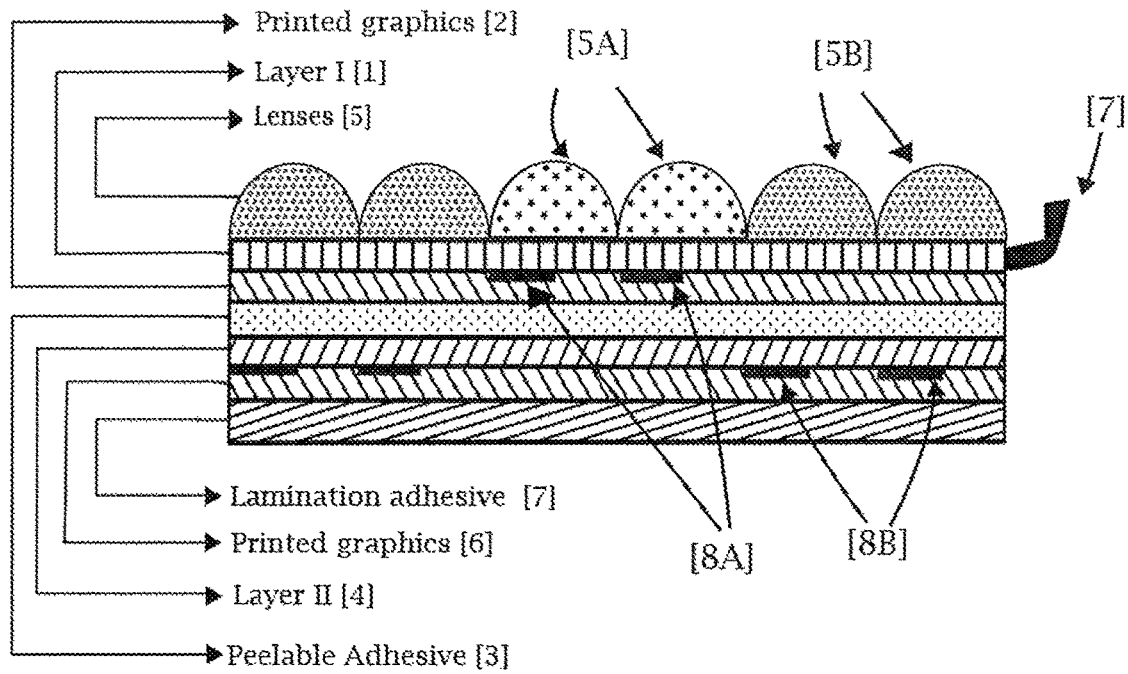
FIG. 6 schematically illustrates a cross-sectional view of a tamper-evident device according to another embodiment of the invention.

FIG. 6 schematically illustrates a further example of the invention in a different embodiment whereby not only the second part of the security device contains image elements (8B), but also the first part of the security device also contains image elements (8A). In particular, the first part (1) of the security device comprises a first sub-array of image elements (8A) disposed upon an underside surface of the flexible plastic layer of the first part. The first part of the security device also comprises a first sub-array of optical focusing lenses (5A) disposed on the outer surface of the transparent plastic layer. Each image element of the first sub-array is in position/alignment with a respective one of the optical focusing lens elements of the first sub-array of optical focusing lenses, and is positioned to be within the focal length of the lens within which it is in position/alignment. Similarly, the second part of the security device comprises a second sub-array of image elements (8B) disposed upon an underside surface of the flexible plastic layer of the part thereof. The second part of the security device also comprises a second sub-array of optical focusing lenses (5B) disposed on the outer surface of its transparent plastic layer. Each image element of the second sub-array is in position/alignment with a respective one of the optical focusing lens elements of the second sub-array of optical focusing lenses, and is also positioned to be substantially coincident with the focal length of the lens within which it is in position/alignment.

Each of the first and second sub-arrays of image elements (8A, 8B) is disposed upon the underside of the transparent plastic layer (1, 4) of the first or second part of the security device, respectively, as a printed layer of graphics (2, 6). A layer of optically transparent and peelable adhesive (3) is disposed between the underside of the printed graphics layer (2) containing the first sub-array of image elements (8A) and the upper side of the transparent plastic layer of the second part of the device. The first part of the device can be separated from the first part by release from the adhesive layer (3) by applying a pulling force manually/mechanically to the tab (7) attached to the transparent plastic layer (1) of the first part as is schematically illustrated in FIG. 4. The consequence of such release is to de-align the optical focusing elements (5B) of the lens array (5), relative to the image elements (8B) of the second sub-array of image elements, while maintaining the optical focusing elements (5A) of the lens array in position/alignment relative to the image elements (8A) of the first sub-array of image elements. The visual effect is to cause an optical image collectively defined by the second sub-arrays of lens elements and image elements (5B, 8B) to cease, while permitting a optical image collectively defined by the first sub-arrays of lens elements and image elements (5A, 8A) to continue. This obvious visual effect allows a user to determine when tampering with the device has taken place.

The focal length of the optical focusing elements of the first sub-array (5A) may be shorter than the focal length of the optical focusing elements of the second sub-array (5B). This is simply because the image elements (8A) of the first sub-array of image elements is closer to the first sub-array of optical focusing elements (5A) with which they are in position/alignment, than the image elements (8B) of the second sub-array are to the second sub-array of optical focusing elements. Each optical focusing element defines a focal length which substantially matches the separation between array of separate optical focusing elements and the array of image elements it is so positioned (e.g. aligned) with. Each optical focusing element may define a focal length which differs from this separation by not more than 50% of that separation, or more preferably by not more than 40%, or more preferably by not more than 30%, or more preferably by not more than 20%, or more preferably by not more than 10% of that separation. Desirably, an (e.g. each) optical focusing element defines a focal length which substantially matches the separation.

Figure 7:
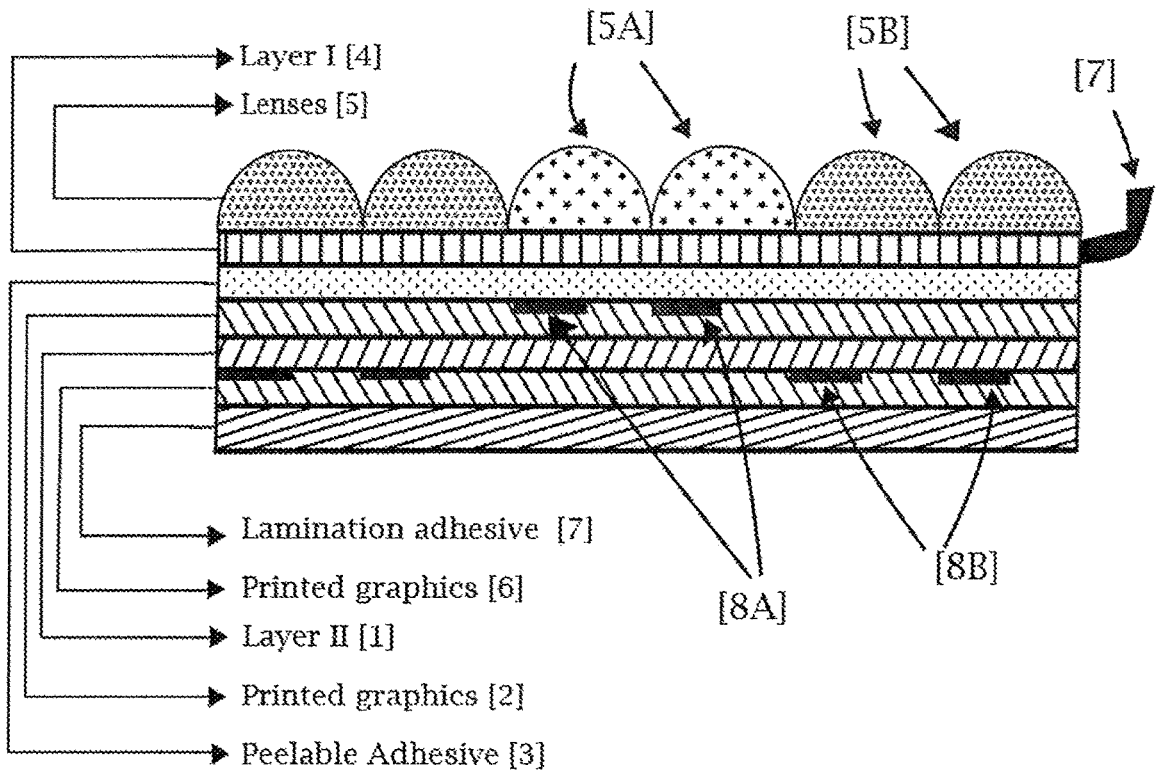
FIG. 7 schematically illustrates a cross-sectional view of a tamper-evident device according to another embodiment of the invention.

FIG. 7 illustrates a further variant of the embodiment shown in FIG. 6. Whereas, in the embodiment of FIG. 6, the first sub-array of image elements (8A) is printed as a layer (2) upon the underside of the transparent plastic layer (1), in the alternative structure of FIG. 7, the first sub-array of image elements (8A) is printed as a layer (2) upon the upper side of the transparent plastic layer of the second part. In this variant, therefore, the transparent plastic layer of the second part has a first sub-array of image elements (8A) printed on one side nearest to the lens array (5), and a second sub-array of image elements (8B) printed on the other side furthest from the lens array (5). The peelable adhesive layer (3) is sandwiched between the transparent plastic layer of the first part, and the printed layer bearing the first sub-array of image elements (8A). Application of a peeling force (F) to the transparent plastic layer of the first part causes the transparent plastic layer of the first part, and the array of lens elements residing on its upper side, to be released from the second part and de-aligned from the first sub-array of image elements (8A) as well as from the second sub-array of image elements (8B).

Figure 8:
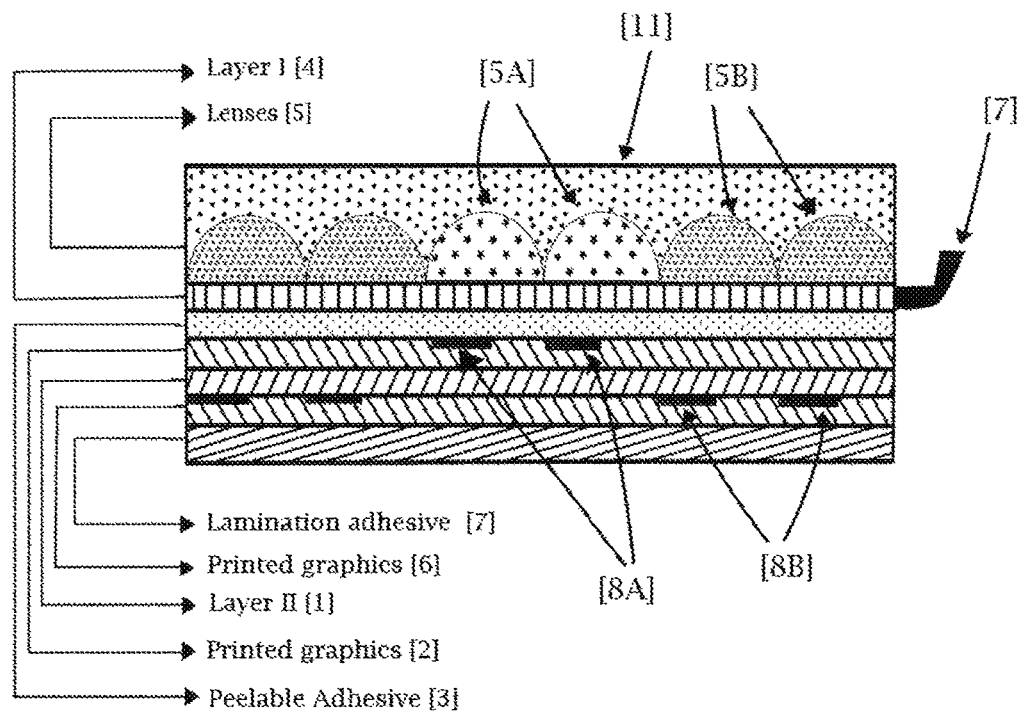
FIG. 8 schematically illustrates a cross-sectional view of a tamper-evident device according to another embodiment of the invention.

FIG. 8 shows a variant of the embodiment illustrated in FIG. 7 whereby an optically transparent overcoat layer (11) is disposed over the top surface of the array of lens elements (5). The overcoat layer is formed from an optically transparent material of very low refractive index, and serves as a protective covering for the lenses. It is preferable that the refractive index of the overcoat layer (11) is as close to the value of 1.0 (one) as possible and that the value of the refractive index is significantly less than the refractive index of the material of the lenses it covers. This is to ensure that a sufficient contrast in refractive index remains at the curved outer surfaces of the lenses, which are in direct contact with the overcoat layer in this embodiment, to allow sufficient optical refraction by the lenses in order to achieve the optical effects described above. Most preferably the refractive index of the material of the overcoat layer (11) is less than 1.4, and an example would be a value between 1.35 and 1.37, inclusive. Suitable optically transparent coating materials such as are readily available and apparent to the skilled person may be employed for this purpose. The refractive index of the material of the lenses is preferably a value greater than 1.55, and more preferably greater than 1.6. For example the refractive index of the material of the lenses may be about 1.65.

Thus, the invention may provide an optical security device as a composite/laminate structure to be applied e.g. to a package such as when the package is opened an image presented by the device, and associated optical effect, is caused to disappear. The device is therefore particularly effective as a tamper evident device. Such device may be applied to containers, tubes, bottles and various other packages for the purpose of sealing the container as a tamper evident label, seal or tag.

The first and second parts of the device are preferably joined via an adhesive forming an optically and chemical stable and transparent structure. The first part comprises optical elements e.g. micro-optic features such as (but not limited to) micro-lenses, lenticular lenses, prisms, pyramids etc., while the second part comprises an image/pattern (an ultra-fine pattern of micro-features) printed on it. As long as the micro-optic elements layer and the micro-feature layer remain in close contact and in mutual positioning/alignment, spatially, as an integral layer as they were manufactured held in position/alignment by the optically transparent adhesive between them, then a viewer will see special optical effects (e.g. a floating or 3D appearance of the printed information or a colour/image flip when the viewer changes the angle of view).

However, when one pulls the tab attached with the first part of the seal, e.g. in order to open a lid of flap of the container sealed by the seal, the first part (top layer) of the structure separates from the second part (bottom layer) and the special optical effect mentioned above disappears. Not only the effect disappears, when the two layers are not in close contact, once the two layers are separated the effect cannot even be regenerated by attempting to re-position/realign without exceptional/prohibitive effort or the use of specialist tools (e.g. a microscope), and therefore the optical affect disappears quasi-permanently. The optically transparent adhesive may also be arranged to undergo a visible colour change when exposed to air as a result of separating the layers of the device.

The peelable adhesive layer is configured and arranged such that when the first part and the second part are initially adhered together, during manufacture of the device, the adhesive shows a stronger adhesive strength than is provided by the adhesive layer in the final device resulting from completion of the manufacturing process. In particular, the adhesive is designed such that the first part and the second part, once initially adhered together during the manufacturing process, cannot be pulled apart subsequently during the manufacturing process without significantly distorting the two parts/layers. However, as a final or subsequent stage of the manufacturing process, after the completion of one or more intervening manufacturing processes subsequent to the initial adhesion step, the adhesive is altered to reduce (but not remove) its adhesive strength. The reduced strength is consistent with an adhesive strength necessary to maintain the integrity of the device when it is applied to a package/object, but to allow separation of the first and second parts of the device by a manual peeling action as described above. The adhesive strength may be substantially and appropriately reduced, during this final manufacturing stage, by a thermal or UV treatment of the adhesive to alter it chemically to reduce its adhesiveness appropriately, thus allowing the layers to separated manually without requiring application of appreciable pulling force. Thus, the adhesive displays strong adhesive properties as long as it is required to be strong. Before the UV exposure or thermal treatment, the peel strength may be 500 gm/inch (19.69 kg/m) or more, preferably may be 750 gm/inch (29.53 kg/m) or more. After exposing the film to UV or UV and heat both, the tackiness is substantially reduced, and the peel strength may be not greater than 300 gm/inch (11.81 kg/m), and even more preferably in the range of 50 m/inch to 250 gm/inch (1.97 kg/m to 9.84 kg/m).

The optically transparent plastic layers of the first part and the second part of the device, may be any plastic layer of substantial transparency and mechanical stability. Preferred examples include (but not limited to these): Polyethylene terephthalate (PET), Polypropylene (PP), Oriented polypropylene (OPP). Biaxially oriented polypropylene (BOPP), polycarbonate (PC) and Acrylic (PMMA). The plastic layer may be a plastic film. The two plastic layers may be of same thicknesses or may be of different relative thicknesses. The preferred thickness of each of the films is between 5 microns and 100 microns, and preferably between 10 microns and 50 microns. For practical considerations, it is preferable to that the film used in the first part has a different thickness than the film used in the second part. The film used in the first part may, for example be thinner than the film used in the second part. This may render it more flexible to implement the aforesaid peeling action. One or both of the plastic films may be plain, e.g. for receiving a said printed layer of image elements, as described above. Alternatively, one or each of the plastic films may be pre-patterned optically, pre-printed or pre-treated in any other fashion, to provide an array of image elements according to the invention (e.g. as an alternative to printing the image elements upon the film via a printed layer).

The optical adhesive can be of any chemical type. However, a solvent-less or a solvent-based acrylic adhesive is preferred for practical purposes. The adhesive preferably initially has a strong tack when used to hold the first part and the second part of the device together during the initial manufacturing process. The adhesive preferably initially comprises a proportion of unreacted acrylic or vinyl groups present. This adhesive may initially be applied to only one of the first part and the second part of the device before the two parts are brought together and adhered to each other via the adhesive. Alternatively, both of the first part and the second part of the device may have such adhesive initially applied to them and the two parts may be adhered together by bringing the two adhesive-bearing parts into contact. The adhesion of the first part to the second part initially, may be performed in presence of heat and/or pressure to lead to a sandwich of high clarity with few (or fewer) defects, or desirably with no defects of consequence.

This sandwich may then be used as a product upon which to print an array of optical focusing elements (e.g. lenses) with appropriate optical properties. These optical properties may include: a specific focal length; a specific optical aperture; a specific geometry. The array of optical focusing elements may comprise single design/structure or type of optical element, or may comprise multiple different such designs/structures or types. Examples include any of: a lenticular lens or an array thereof (e.g. with an optical surface curved in only one plane); a 3-dimensionally lens or array of such lenses (e.g. with an optical surface curved in two orthogonal planes). Such lenses can be designed by various optical design programmes (e.g. 'Zemax' or 'ASAP') using methods well known to an optical design engineer. These lenses of the array of lenses may have any geometry. For example, a lens of the array may have a spherical or an aspherical geometry defined by a specific Conic constant. Preferably, lenses with Conic constants having a value of between −0.1 and −1 are employed in the array of lenses.

The focal length of lenses of the array (e.g. at least some lenses, or all lenses) is preferably substantially equal to the total thickness of the sandwich formed by the adhered first transparent plastic layer and the second part, to which the lens array is affixed to form the device. In other examples, the focal length of lenses of the array may be greater that the combined thicknesses of the first optically transparent plastic layer (of the first part), the second part and the adhesive layer combined. Alternatively, the focal length of lenses of the array may be greater than the combined thickness of the first optically transparent plastic layer (of the first part) including any thickness of an aforesaid sub-array of image elements when disposed upon the first optically transparent optical film of the first part, and the thickness of the adhesive layer combined. In some embodiments, some of the lenses of the array of lenses have a focal length equal to or exceeding the total thickness of the part of the device underlying the lens array, while some lenses of the array have the focal length equal to or exceeding that of the first transparent plastic layer, equal to (or exceeding) the combined thicknesses of the first transparent plastic layer and the adhesive layer. These dissimilar lenses may be randomly distributed spatially within the lens array, or may be distributed through the array of lenses according to a predetermined distribution, e.g. in accordance with a predetermined pattern, or even to define two distinctive areas.

The required lens geometries may be machined on a replication tool using any of the methods of manufacturing lenses readily available to the skilled person. For example, diamond turning may be employed, using an appropriately fashioned micro-machining tool, or specialised laser machining techniques may be used, or photolithography may be used, of melt-flow or screen printing techniques are just some of the commonly used industrial methods for lens manufacture or lens array manufacture. The shape of the replication tool may be that of a cylindrical drum or it may be a flat piece of appropriately selected metal, plastic or alloy. The pattern on the tool may be transferred onto a plastic layer/film using a selected UV curing optical formulation of an appropriate refractive index using a process known as UV embossing or UV cast cure.

An appropriately designed print pattern defining the aforesaid array (or sub-array) of image elements defining a pattern, may then be applied on the underside of the sandwich of layers of the device so far manufactured, assuming the topside of the sandwich is the one bearing the lens array/pattern. The selection of print pattern depends on the type of lenses used. If (and where) the lenses used are the lenticular lenses, the print pattern preferably comprises an array(s) of fine lines with linewidths equal to or smaller than one half of the lens aperture. Each line may be arranged to extend in a direction parallel to the longitudinal length of the lenticular lens with which it is in positioning/alignment. Each such fine line may preferably be positioned so as to be at least partly to one side of the principal optical axis of the lens with which it is in positioning/alignment (e.g. to permit different neighbouring elements to be viewed from different sides of that axis).

The print pattern may be an array of image elements (e.g. lines/dots/symbols) of sizes/diameters may be less than 100 µm, or less than 50 µm, or less than 25 µm. The pitch/period of the image elements (e.g. the spatial distance between corresponding parts of successive elements in the array) preferably differs relative to the pitch/period of lenses of the lens array by e.g. not more than 1%. The pattern may be such that the image elements collectively form an image whereas, regions where there are no image elements may collectively present no image (or a different image to that collectively presented by the image elements). Any print method capable of printing fine lines or dots or other image elements can be used for this purpose. The examples of such methods include: lithography, flexography, gravure or inkjet methods, or a custom variation of these generic methods. The print pattern may comprise a single colour graphic. A single colour graphic may be followed by (e.g. back-coated) an overall cover coating comprising a different colour to that of the printed pattern, such as a complementary second colour, leading to a two-colour effect whereby a printed pattern presents one colour and those parts between image elements of the printed pattern present the other colour of the cover coating. Alternatively, the optical effect described thus far may also be combined with/complemented by a colour graphic printed using standard methods. Such multi-colour graphic may be printed at the front, at back or in any of the layers in between.

The printing operation may be implemented soon after the manufacturing of the lens array, or it can be done as a separate operation, including using a different machine.

The lenses as in the case discussed above with reference to FIG. 1, are exposed to air. In another implementation (FIG. 5), the lenses are surrounded by another material of refractive index lower than 1.45 and preferably between around 1.30-1.40 (instead of air, with refractive index of ~1). Such lenses may be manufactured using a UV curable material of refractive index of greater than 1.55, preferable greater than 1.6 and in particular around 1.65 or more. After the lenses are manufactured, a layer of low refractive index material (of RI<1.4 and preferably around 1.35-1.37) is coated over the top of lenses and UV cured leading to lenses buried under a planer layer. The required printed array of image elements may then be printed on the reverse side of sandwich of layers, as explained above.

In an alternative implementation (FIG. 6), a first sub-array of image elements is selectively applied on the plastic layer of the first part of the device before the application of the adhesive and the subsequent process of lamination of the first and second parts. The array of lenses are then made on the top layer of the laminate followed by final print of a second sub-array of image elements on the bottom side of the laminate. The lenses in this case may be of two (or more) types: one type has a focal length of the order of (to within +/−50%), or substantially equal to the thickness of the upper plastic film (of the first part) while the other type has the focal length of the order of (to within +/−50%), or substantially equal to the total thickness of the sandwich of layers underlying the lens array layer. This also requires selective positioning/alignment of lenses to the particular print pattern leading to two respective optical effects.

In yet another implementation (FIG. 7), the bottom transparent plastic layer of the sandwich (i.e. within the second part) may be coated with an overall colour on its top side before printing the required design of the first sub-array of image elements and the application of adhesive and lamination. A required lens array layer is then applied to the top surface of the laminate, and a print pattern of the second sub-array of image elements is applied at the bottom side of sandwich as discussed above.

A desired property of the adhesive layer used in the process of laminating together the first and second parts of the device, is that it is subsequently caused to lose its tackiness substantially on exposure to UV light or to heat. This means that after the laminate has been exposed to UV for during the manufacturing of lenses of the lens array, and the printing of the array of image elements, the tackiness of the adhesive is substantially reduced. As a result, the first part and the second part of the device/laminate can easily be pulled apart from each other with a little force. Further, the UV dose required for the implementing the required reduction of tackiness of the adhesive, can be tailored by careful selection of its chemical formulation. In one implementation, the adhesive may be such that it is substantially not tacky after the process of manufacturing of lenses of the lens array and application of the print pattern. In another implementation, the laminate may be additionally exposed one or more times to appropriate dose of UV light with or without subsequent heat treatment, before becoming substantially non-tacky. This UV exposure may be done when needed including much later after the main manufacturing operation explained above.

In an alternative implementation, the adhesive is such that the exposure to an appropriate dose of UV or heat leads to degradation of mechanical properties of the adhesive such that it becomes brittle. In yet another implementation, the adhesive may be such that once the seal is opened, and the first and second parts of the device are separated, the exposure of the adhesive to air/moisture leads to colouration or discolouration of the adhesive.

Figure 10:
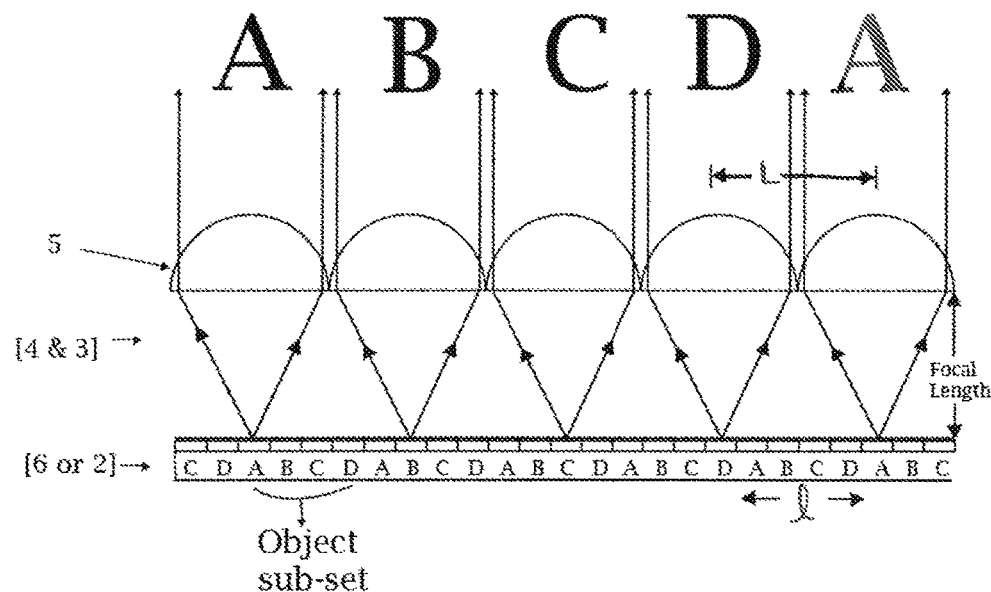
FIG. 10 schematically illustrates a cross-sectional view of a tamper-evident device according to an embodiment of the invention, demonstrating the formation of an optical image according to a Moire-type optical effect.
Figure 11:
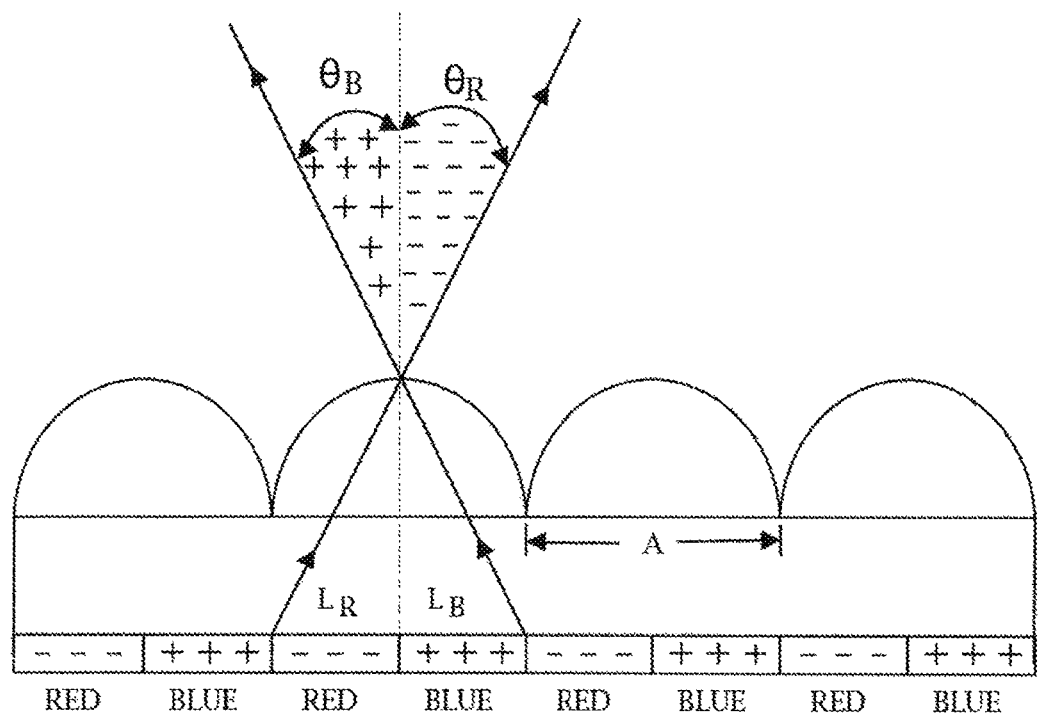
FIGS. 11A and 11B schematically illustrate a cross-sectional views of a tamper-evident device according to embodiments of the invention, demonstrating the formation of an optical effect of displaying different images (e.g. colours) at different observer viewing angles.
Figure 11:
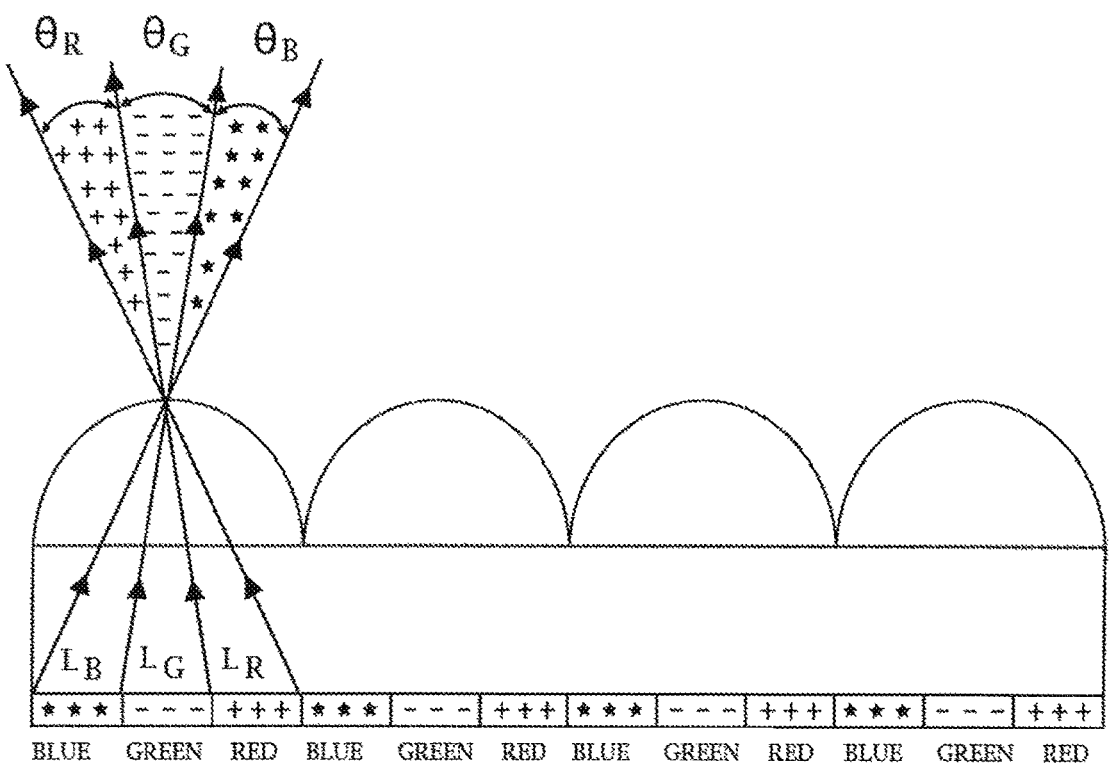

FIGS. 10 and 11A and 11B schematically illustrate three types of optical effect which are provided by preferred embodiments if the invention, such as embodiments from amongst those described above:

A first optical effect is illustrated in FIG. 10. This is the Moire Magnifier effect (also known, in the art, as an 'integral image' effect) caused by a periodic re-positioning/re-alignment or re-registration between lenses of the lens array and image elements of an underlying array of image elements. Consider an array of image elements (6, 2) which comprises a regularly repeating sub-group which repeats along the array with a constant centre-to-centre spatial period (pitch) denoted "I" in FIG. 10. Each sub-group is identical to each other and comprises four image elements (A, B, C and D) arranged linearly in that spatial order. Overlying each sub-group of image elements is a lens of the array of lenses (5) arranged a regularly repeating array with a constant centre-to-centre spatial period (pitch) between lenses denoted "L" in FIG. 10. The Moire Magnifier effect arises when a difference exists between the pitch of the lens array and the pitch of the sub-groups. The magnification factor is: M=LI (L−I). Thus, if (L−I) is small (i.e. L is close to/in value), then large magnifications are possible. For example a 1% relative difference in pitch produces a magnification of M=100.

In Moire Magnifier effect, the entirety of each sub-array image is below one respective lens of the lens array. This has the effect of magnifying the sub-array of image elements as shown schematically in FIG. 10, so that the image 'seen' by the viewer is a magnified version of the image formed by a sub-array of image elements.

A second optical effect is illustrated in FIG. 11A (and also FIG. 9). This is the lenticular effect provided by a positioning/alignment or registration between lenses of the lens array and image elements of an underlying array of image elements. In this case, and also the case in FIG. 11B, the full image is comprised of many finer image elements over a larger region, and not the magnification of a sub-array positioned underneath each lens. The repetition frequency of fine, single image elements may be of the same order as (or substantially the same as) that of the lenses. Consider, for the purposes of illustration (without limitation in the invention), the case of perfect registration between lenses and image elements. In FIG. 11A an array of image elements comprises red elements ("R") defining a red image collectively, and interleaved with this is an array of image elements comprising blue elements ("B") defining a blue image collectively. The quantities: A=the lens aperture (same as the lens pitch in this case); $L_B$=the width of image element of colour blue; $L_R$=the width of image element of colour red; $\theta_R$=the viewing angle over which red element is seen; $\theta_B$=the viewing angle over which blue element is seen. If $L_B=L_R$, the image element is of the order of half of the lens pitch (or aperture). If $L_B=L_R$ then $\theta_R=\theta_B$. But $L_B$ and $L_R$ can be different in which case if $L_B \gg L_R$ then $\theta_R \gg \theta_B$.

FIG. 11B illustrates the use of three types of image elements (e.g. three colours). More may be used. In this arrangement, each lens corresponds to (reveals) three (or more) image elements, one of each of three different colours (e.g. red, green and blue: $L_B$, $L_R$ and $L_G$). Finer image elements are needed to achieve this. In this case the width of each image element is ⅓ of the width of the overlying lens aperture (or ¼ if four colours/elements are used, and so on). In this example, the image elements and lenses are shown as accurately registered, but they do not have to be registered. In particular, an image element $L_B$, $L_R$ or $L_G$ can be part under one lens and part under the other. In that case the eye can still construct the image. The angular alignment between the lenses and printed features is much more important than the lateral position itself. The third effect, mentioned above, arises in the situation which may be used in embodiments, is shown in FIG. 11B in which the image elements of an array of image elements need not be precisely positioned/aligned or exactly registered with lenses of the array of lenses. So even if only a part of an image element (or each image element) is under one given lens of the array of lenses, and the rest of that image element is under another (e.g. neighbouring) lens, then an image will still be formed. In all of these three effects, the spatial repetition frequency (or pitch) of lens elements within the array of lens elements, may be of the same order as the spatial repetition frequency (or pitch) of image elements within the underlying array of image elements. The maximum difference between the value of the spatial repetition frequency (or pitch) of lens elements and the value of the spatial repetition frequency (or pitch) of image elements may be very small, e.g. as little as 1% in relative terms.

UV Activated Anti-Tamper Indicators:

When the two layers of the label are separated as a result of tampering, the interface and the adhesive at the interface is exposed to atmospheric air/oxygen and moisture. Any suitable mechanism that leads to a change of colour on exposure to air or moisture when the label is tampered with in this way can be used for the purpose of tamper proofing. Several such mechanisms described here as example. Other mechanisms would be readily apparent to the skilled person. A preferred implementation of such indicators comprises an indicator ink including: an UV absorbing semiconducting photo-catalyst, a redox indicator dye, a mild reducing agent as the sacrificial electron donor, and an encapsulating polymer. This indicator ink may be coated onto one of the optically transparent layers (e.g. PET layers) of the laminate, or at the top of the adhesive used for laminating the two layers before the lamination. When the ink is exposed to air/oxygen during the coating stage, it will show the blue characteristic colour of the ink. After the ink is sealed within the laminate structure, as formed by bringing the layers of the laminate together, the ink may then be caused to lose its colour rapidly (e.g. in <30 seconds) by being exposed to UVA light. The ink may comprise e.g. made of titanium dioxide, a blue, solvent-soluble, coloured ion-paired methylene blue dye, glycerol and the polymer. Further, the layer remains colourless in the absence of UV, while sealed within the laminate structure, only to regain its original colour when exposed to oxygen again once the laminate structure is broken apart by separating its layers to expose the ink. This provides an UV-activated mechanism to switch the indicator "on" at any time, returning to its original blue colour upon exposure to air. In the latter step the rate of colour recovery is proportional to the level of ambient oxygen and the same film can be UV-activated repeatedly.

A typical ink formulation may consist of: 10 gm of 5 wt. % aqueous dispersion of nano-particulate anatase titania, to photosensitize the reduction of methylene blue (2 gm of a 5 wt. % aqueous solution) by glycerol or triethanolamine (0.6 gm) and a 20 g of 10 wt % aqueous solution of hydroxyethyl cellulose as the polymer encapsulation medium. This solution may be well mixed and kept in sealed bottles in the dark. The ink can then be printed (or simply applied) to one of the optically transparent layers (e.g. PET film) before lamination. The colour of this ink at this state is blue. The ink gets activated upon the exposure to UV upon which its colour fades and remains bleached in the absence of oxygen. The colour recovers to its original colour by exposure to oxygen when the two layers of the laminate are separated in an act of tampering (or intended opening). The indicator may be reusable, and it may be irreversible. Upon irradiation with UVA light, ultra-bandgap illumination of the $TiO_2$ particles creates electron-hole pairs. The photo-generated holes, h+, oxidize the mild sacrificial electron donor glycerol to glyceraldehyde. The remaining photo-generated electrons, $TiO_2$ reduce the redox-sensitive dye, DOx (or methylene blue) to a reduced form, DRed (leuco-methylene blue) that has a different colour to DOx. These components may be encapsulated between the two optically transparent layers (e.g. PET) of the laminate or in a layer containing appropriate polymer (e.g., Hydroxyethyl Cellulose, HEC).

As an alternative method, the adhesive polymer itself may be used as the host for the ink in place of Hydroxyethyl Cellulose. Another alternative indicator ink formulation may comprise of: 40 mg of thionine acetate, 0.6 gm of glycerol and a 0.6 gram of Degussa, P-25 $TiO_2$ powder, which contains anatase and rutile phases in a ratio of about 3:1 as semiconducting photo-catalyst. These components may be added to 3.2 gram of a 90% ethanol solution and dispersed by 5 min of ultrasonication. A quantity of (e.g. 0.5 ml) the resulting ink may be applied onto one of the optically transparent layers (e.g. PET) before the process of lamination and allowed to dry. After drying the coated film may be dipped in 1% alginate solution using dip coating.

The composite micro-optic film thus produced may then be converted into labels using the process described above.

The widths of image elements (e.g. printed lines or dots) may be substantially equal to or of the order of half that of the aperture diameter of the lenses. The widths of image elements may be equal to or less than about ⅓, or about ¼, or about ⅕, or about ⅙ of the aperture diameter of the associated lens. It is preferable to have thinner labels, and preferably thinner than 100 microns, much more preferably thinner than 50 microns. Preferably, the maximum width of an image element is 50 microns, and more preferably the width of an image element is less than 25 microns.

In preferred embodiments of the invention, the adhesive used for the lamination of the two transparent plastic layers of the device (one bearing at least the array of optical focusing elements, the other bearing at least an array of image elements) is a stronger adhesive when the device is being assembled, but is rendered less adhesive to convert the assembly into a suitable tamper evident security device appropriately ready for end use. To this end, the adhesive is preferably such that it may be rendered less tacky to permit the first part and the second part of the device to separate or fall apart on the application of any stretch or peel force to the device.

Adhesives Example:

The following scheme may be used to achieve an adhesive.

A formulation may be prepared using one of more monomers or oligomers, at least 80 weight % of which have a glass transition temperature ($T_g$) of 20 degrees Celsius or less. Examples of such low $T_g$ monomers are: Ethyl Acrylate, Ethyl Hexyl Acrylate (EHA), 2(2-ethoxy ethoxy) ethyl acrylate (EOEOA, SR 256 from Sartomer), Phenylthioethyl Acrylate (PTEA), Octadecyl Acrylate (ODA), Isooctyl Acrylate, Phenoxyethyl Acrylate, Isobutyl acrylate, 4-Hydroxybutyl Acrylate, Ethoxylated nonyl phenol acrylate (CD504 from Sartomer), Isotridecyl Acrylate, Lauryl Acrylate, Tetrahydrofurfuryl Acrylate, Ethoxylated Neopentyl Acrylate, 2-Methoxyethyl acrylate, Or the corresponding methacrylate.

Examples of low $T_g$ oligomers are (but are not limited to): Aliphatic Urethane Diacrylates (such as Ebecryl 230, 270, 8411 and 8296 from Allnex (formerly Cytec), Qualicure GU3001Z, GU3010Z, GU3030Z, GU3290M, GU3300W and GU3300Z from Qualipoly Chemicals, Taiwan), Aromatic Urethane Acrylate (Such as Ebecryl 4827 from Allnex, formerly Cytec), Polyester Aromatic Urethane Diacrylates (Such as Qualicure GU3701W from Qualipoly Chemicals, Taiwan), Polyether Acrylate (Ebecryl 81 from Allnex, formerly Cytec), Epoxy Acrylate (Ebecryl 3212 from Allnex, formerly Cytec). There also are a range of Urethane Acrylate Oligomers from Sartomer (e.g., Sartomer CN934, CN 962, CN964, CN965, CN966H90, CN972, CN973H85 and CN980 or Photomer 6629, 6630, 6576 from IGM Resins).

The remaining 20% of the formulation can consist of other normal single functional acrylic monomers or oligomers.

Furthermore, 1% to 7% (by weight of the content of monomers/oligomers) of a suitable free-radical photo-initiator may be added to this mixture and thoroughly mixed. Suitable examples of the commercially available photo-initiators include (but are not limited to): Irgacure 184, 651, 819, 907, 1173, 2959 from Ciba Geigy or Esacure KIP100F from Lamberti, USA.

Furthermore, 5% to 20% (by weight) of one or more of glycidyl containing monomers and a suitable photo-acid generator (1-6% of the glycidyl containing monomer by weight) may be also added to the above formulation mixture and thoroughly mixed.

Examples of glycidyl group containing monomers are: Glycidyl Acrylate and Glycidyl Methacrylate. Further, up to 5% (by weight) of the glycidyl containing part can also come from either bifunctional epoxy resin such as bisphenol. A type epoxy may comprise; a novolak epoxy resin such as phenol novolak epoxy resin or cresol novolak epoxy resin or the like. Moreover, an ordinarily-known epoxy resin can be used, examples of which include polyfunctional epoxy resin, glycidylamine epoxy resin, heterring-containing epoxy resin, or alicyclic epoxy resin.

Examples of well-known photo-acid generators are: Methoxyphenyldiphenylsulfonium triflate, (4-tert-Butylphenyl)diphenylsulfonium triflate, Diphenyliodonium hexafluorophosphate, Diphenyliodonium nitrate, Diphenyliodonium perfluoro-1-butanesulfonate electronic grade, Diphenyliodonium triflate, (4-Fluorophenyl)diphenylsulfonium triflate, N-Hydroxynaphthalimide triflate, (4-Iodophenyl)diphenylsulfonium triflate, (4-Methoxyphenyl)diphenylsulfonium triflate, (4-Methylphenyl)diphenylsulfonium triflate, (4-Methylthiophenyl) methyl phenyl sulfonium triflate, (4-Phenoxyphenyl)diphenylsulfonium triflate, (4-Phenylthiophenyl)diphenylsulfonium triflate, Triarylsulfonium hexafluorophosphate salts, Triphenylsulfonium triflate, Tris (4-tert-butylphenyl) sulfonium triflate.

The tackiness of the formulation can further be enhanced by using additional Rosin or hydrocarbon type tackifier resins to the above formulations. Examples are: C9 hydrocarbon resin (Norsolene S115 C9 from Cray Valley) or Staybelite Resin-E, Tacolyn 3179 H resin or Foral™ AX-E resins from Eastman.

Further, one or more of inorganic fillers may be used, such as: alumina, aluminium nitride, boron nitride, crystalline silica, amorphous silica, magnesium oxide, magnesium carbonate or calcium carbonate. These may also be added to the above mixture.

There exist range of coating additives, available to the skilled person, which are typically used as additives to UV coating formulations, for achieving various process benefits. Use of various surfactants (such as Tego Twin 4100 or Tego Wet 270 from Evonik or Additol VXL 4930 from Allnex, formerly Cytec) and Antioxidants (such as Irganox 1010 from Ciba-Geigy Co.) is well known to a practitioner of UV coatings. Such additives can also be added to the formulation described above, according to preferred embodiments of the invention, as appropriate.

An alternative approach for the preparation of desired adhesive can be to use a pre-formulated polymer solution as explained below.

An acrylate (pre)polymer can be formed by either UV or thermal polymerisation of monomers and oligomers. This may be done in the presence of appropriate solvents in case of thermal polymerisation. However, if UV polymerisation is used, the solvent may or may not be used.

For achieving the adhesive using thermal polymerisation, one or more single functional monomers with glass transition temperature ($T_g$) below 20 degree Celsius, may be mixed and one or more solvents may be added to these in an appropriate ratio. Furthermore, 2%-5% (by weight) of a thermal initiator may be also added to it. The reaction mixture may then be reacted at elevated temperature for 4 to 12 hours, while the nitrogen is being passed through the reactor. At the end of the reaction a viscous polymer solution with desired concentration may be obtained.

The examples of such single functional low $T_g$ monomers are given above.

The above reaction may also be conducted in presence of a UV initiator (rather than a thermal initiator) and by exposing the reaction mixture to UV light (instead of elevated temperature) for 5 to 60 minutes (depending upon the intensity of UV light) under constant stirring. UV polymerisation may also lead to a similar polymer with required viscosity and chain length as the thermal polymerisation process described above.

The following process may be used to formulate a solvent-less pre-polymer with required viscosity, and chain length. A pre-determined formulation consisting of low glass transition temperature ($T_g$) single functional monomer (e.g. chosen from the list above) may be weighted in a round bottom flask and 1% to 6% (by weight) of photo-initiators (e.g. only one or a mixture of a plurality) is be added to it. The flask may be connected to a rotary evaporator and nitrogen gas is be bubbled through the mixture. A high-powered UV lamp is placed in front of this assembly and while the flask is rotating the mixture is exposed to UV light for 5 to 20 minutes. The increase in viscosity can be visually monitored and as soon as the viscosity appears to be in the expected range, the UV light and nitrogen gas may be switched off and the flask may be flushed with Oxygen instead, in order to stop the UV polymerisation reaction. A pre-polymer with required viscosity and molecular weight is thus formed, which can be used for subsequent coating applications.

Furthermore, 5% to 25% of one or more of a common single functional monomer can also be mixed to the solvent-containing or solvent-less, pre-polymers formulated by thermal or UV polymerisation as described above.

Alternatively, 10 to 80% of one or more of low $T_g$ oligomers (examples of which are given above) can also be added to the above prepolymers.

In the situation when either a single functional monomer as described above, or a low $T_g$ Oligomer as described above, or both, are present, then 1% to 7% (by weight of the content of monomers/oligomers) of a suitable free-radical photo-initiator may also added to this mixture. Suitable examples of the commercially available photo-initiators are given above.

Further, 5% to 20% (of the total formulation weight) of one or more of glycidyl containing monomers and a suitable photo-acid generator (1%-6% of the glycidyl containing monomer by weight) may also be mixed to the above formulation mixture. The examples of the Glycidyl containing monomers/oligomers as well as those of photo-acid generators are also as described above. Furthermore, the usual coating additives as mentioned above (and is well known to a practitioner in the area of coatings and adhesive) can also be added to the resulting formulation.

The resulting adhesive formulation can then be used for the purpose of laminating together the first part and the second part of the device. For this purpose, the formulation may be coated on a layer(s) of the device, using any of the common coating methods and then laminated with another layer(s) of the device, and UV cured. In implementations using a solvent-containing pre-polymer, the adhesive coating may be exposed to heat (to drive the solvents out) prior to the lamination process and UV curing process.

This laminated parts may then be used for the purpose of manufacturing/applying thereto the array of optical focusing elements (e.g. lenses) on one side and printing image elements on the reverse side. The resulting film can then also be converted to a label as described above, e.g. including the process of die and/or kiss cutting of one/some of the layers of the device, as required.

The label can then be exposed to a temperature of between 50 degrees Celsius and 100 degrees Celsius, or to a UV light dosage, for e.g. between 2 minutes and 10 minutes. This exposure to heat (or UV light) allows the photo-acid created during the previous exposure of UV light described above, to lead to ring opening polymerisation of the glycidyl groups. This further cross-linking of glycidyl groups leads to further cross-linking of coated layer and thus reduces or eliminates the tackiness of the adhesive.

The device so prepared can then be applied to the packages for the purpose of a tamper evident device.

Various embodiments of the invention are described above. While these descriptions directly describe the above embodiments, it is understood that those skilled in the art may conceive modifications and/or variations to the specific embodiments shown and described herein. Any such modifications or variations that fall within the purview of this description are intended to be included therein as well.

Unless specifically noted, it is the intention of the inventor that the words and phrases in the specification and claims be given the ordinary and accustomed meanings to those of ordinary skill in the applicable art(s).

The foregoing description of preferred embodiments and best mode of the invention known to the applicant at this time of filing the application has been presented and is intended for the purposes of illustration and description. It is not intended to be exhaustive or limit the invention to the precise form disclosed and many modifications and variations are possible in the light of the above teachings. The embodiments were chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out this invention, but that the invention will include all embodiments falling within the scope of the appended claims.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A tamper-evident security device comprising:
   an optically transparent layer including an array of separate optical focusing elements;
   an array of separate image elements collectively defining an image viewable through the optically transparent layer when each of the optical focusing elements is positioned to reveal therethrough a view of one or more of said image element(s); and
   an optically transparent adhesive layer between the optically transparent layer and the array of separate image elements, in which the optically transparent adhesive layer retains the optical focusing elements so positioned with respect to the image elements thereby in cooperation to reveal the image, a predetermined sub-portion of the optically transparent adhesive layer or the optically transparent layer arranged to undergo a visible color change relative to a remainder of the optically transparent adhesive layer or the optically transparent layer when exposed to air as a result of separating the layers of the device, wherein the predetermined sub-portion is non-detectable before separation, and
   wherein the optically transparent layer is mechanically separable from the array of separate image elements by release of the optically transparent adhesive layer to cease said cooperation.

2. The temper-evident security device according to claim 1, in which at least one of the optical focusing elements defines a focal length which substantially matches a thickness of the optically transparent layer and the thickness of the optically transparent adhesive layer, and the thickness of the array of separate image elements combined into a layer, or differs therefrom by an amount not more than 50% thereof.

3. The temper-evident security device according to claim 1, in which the optically transparent layer includes a second array of separate optical focusing elements and a second array of separate image elements which collectively define a second image viewable through the optically transparent layer, wherein optical focusing elements of said second array of optical focusing elements are positioned to reveal therethrough a view of one or more of said image elements of the second array of image elements.

4. The temper-evident security device according to claim 1, in which some or each of said optical focusing elements define a respective optical aperture the width dimension of which does not exceed 200 µm.

5. The temper-evident security device according to claim 1, in which some or each of said image elements has width dimension not exceeding 100 µm.

6. The temper-evident security device according to claim 1, in which one of the optical focusing elements defines a focal length which is substantially equal to the distance of separation between the optical focusing element and the image element with respect to which it is so positioned, or differs therefrom by not more than 50% of said distance.

7. The temper-evident security device according to claim 1, in which some or each of said optical focusing elements has a focal length which does not exceed 200 µm.

8. The temper-evident security device according to claim 1, in which one of the optical focusing elements comprises a lens.

9. The temper-evident security device according to claim 1, in which said adhesive layer is non-adherent to the optically transparent layer or the array of separate image elements after said release of the optically transparent adhesive layer from the optically transparent layer or the array of separate image elements, respectively.

10. The temper-evident security device according to claim 1, in which the optically transparent layer, the array of separate image elements and the optically transparent adhesive layer collectively define a laminate.

11. The temper-evident security device according to claim 1, in which the optically transparent adhesive layer is arranged such that a peel strength required to release optically transparent layer from array of separate image elements is not greater than 300 gm/inch (11.81 kg/m).

12. The temper-evident security device according to claim 1, in which defining a label in which a second adhesive layer is disposed on a surface of the array of separate image elements other than between the array of separate image elements and the optically transparent layer, wherein the second adhesive layer is tacky for affixing the label to a surface.

13. The temper-evident security device according to claim 1, wherein the optically transparent adhesive layer includes an indicator ink arranged to undergo an irreversible visible color change when exposed to UV light as a result of separating the first part from the second part.

14. A method of manufacturing a tamper-evident security device, the method comprising:
   providing an optically transparent layer including an array of separate optical focusing elements;
   providing an array of separate image elements collectively defining an image viewable through the optically transparent layer, wherein each of the optical focusing elements is positioned to reveal therethrough a view of one or more of said image element(s); and
   providing an optically transparent adhesive layer between the optically transparent layer and the array of separate image elements which retains the optical focusing elements so positioned with respect to the image elements thereby in cooperation to reveal the image, wherein the optically transparent adhesive layer is light-sensitive, the method including applying light to the light-sensitive adhesive layer to reduce the adhesive strength of the optically transparent adhesive layer thereby to render the optically transparent layer mechanically separable from the array of separate image elements by release of the optically transparent adhesive layer to cease said cooperation, and wherein the optically transparent adhesive layer remains adhered between the optically transparent layer and the array of separate image elements after applying the light thereto, wherein a predetermined sub-portion of the optically transparent adhesive layer or the optically transparent layer is arranged to undergo a visible color change relative to a remainder of the optically transparent adhesive layer or the optically transparent layer when exposed to air as a result of separating the layers of the device, and the predetermined sub-portion is non-detectable before separation, and wherein the adhesive strength of the optically transparent adhesive layer renders the optically transparent layer mechanically separable from the array of separate image elements by release of the optically transparent adhesive layer to cease the cooperation.

15. The method according to claim 14, in which the optically transparent adhesive layer comprises an acrylate polymer formed by a polymerization of monomers or oligomers.

16. The method according to claim 14, wherein said applying light to the light-sensitive adhesive layer comprises illuminating the light-sensitive adhesive layer with Ultra-Violet (UV) light.

17. The method according to claim 14, including disposing a second adhesive layer on a surface of the array of separate image elements other than between the array of separate image elements and the optically transparent layer to define a label, wherein the second adhesive layer is tacky for affixing the label to a surface.

18. The method according to claim 14, wherein the indicator ink includes one of a UV absorbing semiconducting photo-catalyst, a redox indicator dye, a mild reducing agent as the sacrificial electron donor, and an encapsulating polymer, and wherein a predetermined portion of the optically transparent adhesive is further configured to undergo the visible color change when exposed to air as a result of separating the layers of the device, a shape of the predetermined portion being non-detectable before separation.

19. A tamper-evident security device comprising:
an optically transparent layer including a first array of separate optical focusing elements;
a first array of separate image elements collectively defining an image viewable through the optically transparent layer when each of the optical focusing elements is positioned to reveal therethrough a view of one or more of said image element(s);
an optically transparent adhesive layer between the optically transparent layer and the first array of separate image elements, in which the optically transparent adhesive layer retains the optical focusing elements so positioned with respect to the image elements thereby in cooperation to reveal the image wherein a predetermined sub-portion of the optically transparent adhesive layer or the optically transparent layer is arranged to undergo a visible color change relative to a remainder of the optically transparent adhesive layer or the optically transparent layer when exposed to air as a result of separating the layers of the device, wherein the predetermined sub-portion is non-detectable before separation, the optically transparent layer including:
a second array of separate optical focusing elements, wherein optical focusing elements of said second array of optical focusing elements are positioned to reveal therethrough a view of one or more of said first array of separate image elements, and
a second array of separate image elements on an underside surface of a flexible plastic layer of the optically transparent adhesive layer and which collectively define a second image viewable through the optically transparent layer,
wherein the first array of optical focusing elements are positioned to be non-overlapping with one another with the focusing elements of the second array of optical focusing elements, and
wherein the optically transparent layer is mechanically separable from the array of separate image elements by release of the optically transparent adhesive layer to cease said cooperation.

20. A tamper-evident security device comprising:
an optically transparent layer including an array of separate optical focusing elements;
an array of separate image elements collectively defining an image viewable through the optically transparent layer when each of the optical focusing elements is positioned to reveal therethrough a view of one or more of said image element(s); and
an optically transparent adhesive layer between the optically transparent layer and the array of separate image elements, in which the optically transparent adhesive layer retains the optical focusing elements so positioned with respect to the image elements thereby in cooperation to reveal the image,
wherein a predetermined sub-portion of the optically transparent adhesive layer or the optically transparent layer includes an indicator ink arranged to undergo an irreversible visible color change relative to a remainder of the optically transparent adhesive layer or the optically transparent layer when exposed to UV light as a result of separating the first part from the second part, and the predetermined sub-portion is non-detectable before separation, and
wherein the optically transparent layer is mechanically separable from the array of separate image elements by release of the optically transparent adhesive layer to cease said cooperation.

* * * * *